(12) United States Patent
Kim et al.

(10) Patent No.: US 11,562,507 B2
(45) Date of Patent: Jan. 24, 2023

(54) POINT CLOUD COMPRESSION USING VIDEO ENCODING WITH TIME CONSISTENT PATCHES

(71) Applicant: Apple Inc., Cupertino, CA (US)

(72) Inventors: Jungsun Kim, San Jose, CA (US); Alexandros Tourapis, Los Gatos, CA (US); Khaled Mammou, Vancouver (CA); Chao Cao, Evry (FR); Marius Preda, Evry (FR)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 17/031,787

(22) Filed: Sep. 24, 2020

(65) Prior Publication Data

US 2021/0097723 A1 Apr. 1, 2021

Related U.S. Application Data

(60) Provisional application No. 62/964,051, filed on Jan. 21, 2020, provisional application No. 62/907,423, filed on Sep. 27, 2019.

(51) Int. Cl.
*G06V 30/00* (2022.01)
*G06T 9/00* (2006.01)
(Continued)

(52) U.S. Cl.
CPC .............. *G06T 9/00* (2013.01); *G06T 5/002* (2013.01); *G06T 7/74* (2017.01); *H04N 19/137* (2014.11);
(Continued)

(58) Field of Classification Search
CPC ....... G06T 3/00; G06T 3/0006; G06T 3/4046; G06T 9/00; G06T 5/002; G06T 7/74;
(Continued)

(56) References Cited

U.S. PATENT DOCUMENTS

| 5,793,371 A | 8/1998 | Deering |
| 5,842,004 A | 11/1998 | Deering |

(Continued)

FOREIGN PATENT DOCUMENTS

| CA | 309618 | 10/2019 |
| CN | 10230618 | 1/2012 |

(Continued)

OTHER PUBLICATIONS

Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.

(Continued)

*Primary Examiner* — Amir Alavi
(74) *Attorney, Agent, or Firm* — Alexander A. Knapp; Kowert, Hood, Munyon, Rankin & Goetzel, P.C.

(57) ABSTRACT

A system comprises an encoder configured to compress attribute and/or spatial information for a point cloud and/or a decoder configured to decompress compressed attribute and/or spatial information for the point cloud. To compress the attribute and/or spatial information, the encoder is configured to convert a point cloud into an image based representation. Also, the decoder is configured to generate a decompressed point cloud based on an image based representation of a point cloud. In some embodiments, an encoder generates time-consistent patches for multiple version of the point cloud at multiple moments in time and uses the time-consistent patches to generate image based representations of the point cloud at the multiple moments in time.

20 Claims, 21 Drawing Sheets

Compression of Inter Point Cloud Frames

(51) Int. Cl.
    *G06T 5/00*           (2006.01)
    *G06T 7/73*           (2017.01)
    *H04N 19/137*       (2014.01)
    *H04N 19/80*        (2014.01)
    *H04N 19/172*       (2014.01)
    *H04N 19/60*        (2014.01)

(52) U.S. Cl.
    CPC ........... *H04N 19/172* (2014.11); *H04N 19/60* (2014.11); *H04N 19/80* (2014.11); *G06T 2207/10028* (2013.01); *G06T 2207/20224* (2013.01)

(58) Field of Classification Search
    CPC ............. G06T 7/73; G06T 2207/20224; G06T 2207/10028; H04N 19/137; H04N 19/80; H04N 19/172; H04N 19/60
    See application file for complete search history.

(56) References Cited

U.S. PATENT DOCUMENTS

| | | |
|---|---|---|
| 5,867,167 A | 2/1999 | Deering |
| 5,870,094 A | 2/1999 | Deering |
| 5,905,502 A | 5/1999 | Deering |
| 5,933,153 A | 8/1999 | Deering |
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 8,055,070 B2 | 11/2011 | Bassi et al. |
| 8,264,549 B2 | 9/2012 | Tokiwa et al. |
| 8,411,932 B2 | 4/2013 | Liu et al. |
| 8,520,740 B2 | 8/2013 | Flachs |
| 8,643,515 B2 | 2/2014 | Cideciyan |
| 8,780,112 B2 | 7/2014 | Kontkanen et al. |
| 8,805,097 B2 | 8/2014 | Ahn et al. |
| 8,884,953 B2 | 11/2014 | Chen et al. |
| 9,064,311 B2 | 6/2015 | Mammou et al. |
| 9,064,331 B2 | 6/2015 | Yamashita |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Arlinsky et al. |
| 10,546,415 B2* | 1/2020 | Petkov .................... G06T 15/06 |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2* | 4/2021 | Lim ...................... G06T 7/337 |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2* | 5/2021 | Oh ............. G06T 7/60 |
| 11,044,478 B2 | 6/2021 | Tourapis et al. |
| 11,044,495 B1 | 6/2021 | Dupont |
| 11,095,908 B2* | 8/2021 | Dawar ................ H04N 19/172 |
| 11,113,845 B2 | 9/2021 | Tourapis et al. |
| 11,122,102 B2* | 9/2021 | Oh ............ G06T 17/10 |
| 11,122,279 B2* | 9/2021 | Joshi ................. H04N 19/44 |
| 11,132,818 B2 | 9/2021 | Mammou et al. |
| 11,200,701 B2* | 12/2021 | Aksu .................. G06T 9/001 |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2* | 2/2022 | Roimela ............... G06T 9/001 |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2* | 5/2022 | Melkote Krishnaprasad ............. G06T 19/006 |
| 11,363,309 B2 | 6/2022 | Tourapis et al. |
| 11,386,524 B2 | 7/2022 | Mammou et al. |
| 11,398,058 B2* | 7/2022 | Zakharchenko .......... G06T 9/00 |
| 2002/0181741 A1 | 12/2002 | Masukura |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2009/0016598 A1 | 1/2009 | Lojewski |

(56) References Cited

U.S. PATENT DOCUMENTS

| | | |
|---|---|---|
| 2009/0087111 A1 | 4/2009 | Noda et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0195352 A1 | 8/2013 | Nystad |
| 2013/0202197 A1 | 8/2013 | Reeler |
| 2013/0321418 A1 | 12/2013 | Kirk |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Boch |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0249401 A1 | 8/2017 | Eckart et al. |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0268570 A1 | 9/2018 | Budagavi et al. |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy et al. |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0153885 A1 | 5/2020 | Lee et al. |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |
| 2020/0228836 A1 | 7/2020 | Schwarz et al. |
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0084333 A1 | 3/2021 | Zhang |

(56) References Cited

U.S. PATENT DOCUMENTS

| | | | |
|---|---|---|---|
| 2021/0090301 | A1 | 3/2021 | Mammou et al. |
| 2021/0097723 | A1* | 4/2021 | Kim .................... G06T 9/00 |
| 2021/0097725 | A1 | 4/2021 | Mammou et al. |
| 2021/0097726 | A1 | 4/2021 | Mammou et al. |
| 2021/0099701 | A1 | 4/2021 | Tourapis et al. |
| 2021/0103780 | A1 | 4/2021 | Mammou et al. |
| 2021/0104014 | A1 | 4/2021 | Kolb, V |
| 2021/0104073 | A1 | 4/2021 | Yea et al. |
| 2021/0104075 | A1 | 4/2021 | Mammou et al. |
| 2021/0105022 | A1 | 4/2021 | Flynn et al. |
| 2021/0105493 | A1 | 4/2021 | Mammou et al. |
| 2021/0105504 | A1 | 4/2021 | Hur et al. |
| 2021/0112281 | A1 | 4/2021 | Wang |
| 2021/0119640 | A1 | 4/2021 | Mammou et al. |
| 2021/0142522 | A1 | 5/2021 | Li |
| 2021/0150765 | A1 | 5/2021 | Mammou |
| 2021/0150766 | A1 | 5/2021 | Mammou et al. |
| 2021/0166432 | A1 | 6/2021 | Wang |
| 2021/0166436 | A1 | 6/2021 | Zhang |
| 2021/0168386 | A1 | 6/2021 | Zhang |
| 2021/0183112 | A1 | 6/2021 | Mammou et al. |
| 2021/0185331 | A1 | 6/2021 | Mammou et al. |
| 2021/0195162 | A1 | 6/2021 | Chupeau et al. |
| 2021/0203989 | A1 | 7/2021 | Wang |
| 2021/0211724 | A1 | 7/2021 | Kim et al. |
| 2021/0217139 | A1 | 7/2021 | Yano |
| 2021/0217203 | A1 | 7/2021 | Kim et al. |
| 2021/0217206 | A1 | 7/2021 | Flynn |
| 2021/0218969 | A1 | 7/2021 | Lasserre |
| 2021/0218994 | A1 | 7/2021 | Flynn |
| 2021/0233281 | A1 | 7/2021 | Wang et al. |
| 2021/0248784 | A1 | 8/2021 | Gao |
| 2021/0248785 | A1 | 8/2021 | Zhang |
| 2021/0256735 | A1 | 8/2021 | Tourapis et al. |
| 2021/0258610 | A1 | 8/2021 | Iguchi |
| 2021/0264640 | A1 | 8/2021 | Mammou et al. |
| 2021/0264641 | A1 | 8/2021 | Iguchi |
| 2021/0266597 | A1 | 8/2021 | Kim et al. |
| 2021/0295569 | A1 | 9/2021 | Sugio |
| 2021/0319593 | A1 | 10/2021 | Flynn |
| 2021/0400280 | A1 | 12/2021 | Zaghetto |
| 2021/0407147 | A1 | 12/2021 | Flynn |
| 2021/0407148 | A1 | 12/2021 | Flynn |
| 2022/0164994 | A1* | 5/2022 | Joshi .................... G06T 17/205 |

FOREIGN PATENT DOCUMENTS

| | | |
|---|---|---|
| CN | 104408689 | 3/2015 |
| CN | 106651942 | 5/2017 |
| CN | 108632607 | 10/2018 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| WO | 200004506 | 1/2000 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Li Li, et al., Efficient Projected Frame Padding for Video-based Point Cloud Compression, IEEE Transactions on Multimedia, doi: 10.100/TMM.2020.3016894, 2020, pp. 1-14.

Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.

Ismael Daribo, et al., "Efficient Rate-Distortion Compression on Dynamic Point Cloud for Grid-Pattern-Based 3D Scanning Systems", 3D Research 3.1, Springer, 2012, pp. 1-9.

Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.

Siheng Chen, et al., "Fast Resampling of 3D Point Clouds via Graphs", arXlv:1702.06397v1, Feb. 11, 2017, pp. 1-15.

Nahid Sheikhi Pour, "Improvements for Projection-Based Point Cloud Compression", MS Thesis, 2018, pp. 1-75.

Robert Skupin, et al., "Multiview Point Cloud Filtering for Spatiotemporal Consistency", VISAPP 2014—International Conference on Computer Vision Theory and Applications, 2014, pp. 531-538.

International Search report and Written Opinion from PCT/US/2020/052882, dated Dec. 16, 2020, pp. 1-20.

Jianqiang Liu et al, "Data-Adaptive Packing Method for Compresssion of Dynamic Point Cloud Sequences", dated Jul. 8, 2019, pp. 904-909.

"V-PCC Codec Description", 127. MPEG Meeting; Jul. 8, 2019-Jul. 12, 2019; Gothenburg; (Motion Picture Expert Group or ISO/IEC JTC1/SC29/WG!!), dated Sep. 25, 2019.

Jorn Jachalsky et al, "D4.2.1 Scene Analysis with Spatio-Temporal", dated Apr. 30, 2013, pp. 1-60.

Lasserre S et al, "Global Motion Compensation for Point Cloud Compression in TMC3", dated Oct. 3, 2018, pp. 1-28.

Stefan Gurnhold et al, "Predictive Point-Cloud Compression", dated Jul. 31, 2005, pp. 1-7.

Pierre-Marie Gandoin et al, "Progressive Lossless Compression of Arbitrary Simplicial Complexes", Dated Jul. 1, 2002, pp. 1-8.

U.S. Appl. No. 17/691,754, filed Mar. 10, 2022, Khaled Mammou.

Tilo Ochotta et al, "Image-Based Surface Compression", dated Sep. 1, 2008, pp. 1647-1663.

W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.201 7.8122226 (Year 2017).

Kerning Cao, et al., "Visual Quality of Compressed Mesh and Point Cloud Sequences", IEEE Access, vol. 8, 2020. Pages 171203-171217.

Merry et al., Compression of dense and regular point clouds, Proceedings of the 4th international conference on Computer graphics, virtual reality, visualisation and interaction in Africa (pp. 15-20). ACM. (Jan. 2006).

Lustosa et al., Database system support of simulation data, Proceedings of the VLDB Endowment 9.13 (2016): pp. 1329-1340.

Hao Liu, et al., "A Comprehensive Study and Comparison of Core Technologies for MPEG 3D Point Cloud Compression", arXiv:1912.09674v1, Dec. 20, 2019, pp. 1-17.

Styliani Psomadaki, "Using a Space Filing Curve For The Management of Dynamic Point Cloud Data in a Relational DBMS", Nov. 2016, pp. 1-158.

Remi Cura et al., "Implicit Lod for Processing and Classification in Point Cloud Servers", dated Mar. 4, 2016, pp. 1-18.

Yan Huang et al, Octree-Based Progressive Geometry Coding of Point Clouds, dated Jan. 1, 2006, pp. 1-10.

Khaled Mammou, et al., "G-PCC codec description v1", International Organisation for Standardisation, ISO/IEC JTC1/SC29/WG11, Oct. 2018, pp. 1-32.

G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.

(56) References Cited

OTHER PUBLICATIONS

U.S. Appl. No. 17/718,647, filed Apr. 12, 2022, Alexandros Tourapis, et al.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.
"Continuous improvement of study text of ISO-IEC CD 23090-5 Video-Based Point Cloud Compression" dated May 8, 2019, pp. 1-140.
Mehlem D. et al, "Smoothing considerations for V-PCC", dated Oct. 2, 2019, pp. 1-8.
Flynn D et al, "G-PCC Bypass coding of bypass bins", dated Mar. 21, 2019, pp. 1-3.
Sharman K et al, "CABAC Packet-Based Stream", dated Nov. 18, 2011, pp. 1-6.
Lasserre S et al, "On bypassed bit coding and chunks", dated Apr. 6, 2020, pp. 1-3.
David Flynn et al, "G-pcc low latency bypass bin coding", dated Oct. 3, 2019, pp. 1-4.
Chuan Wang, et al., "Video Vectorization via Tetrahedral Remeshing", IEEE Transactions on Image Processing, vol. 26, No. 4, Apr. 2017, pp. 1833-1844.
Pragyana K. Mishra, "Image and Depth Coherent Surface Description", Doctoral dissertation, Carnegie Mellon University, The Robotics Institute, Mar. 2005, pp. 1-152.
Robert Cohen, "CE 3.2 point-based prediction for point loud compression", dated Apr. 2018, pp. 1-6.
Jang et al., Video-Based Point-Cloud-Compression Standard in MPEG: From Evidence Collection to Committee Draft [Standards in a Nutshell], IEEE Signal Processing Magazine, Apr. 2019.
Ekekrantz, Johan, et al., "Adaptive Cost Function for Pointcloud Registration," arXiv preprint arXiv: 1704.07910 (2017), pp. 1-10.
Vincente Morell, et al., "Geometric 3D point cloud compression", Copyright 2014 Elsevier B.V. All rights reserved, pp. 1-18.
U.S. Appl. No. 17/523,826, filed Nov. 10, 2021, Mammou, et a.
Chou, et al., "Dynamic Polygon Clouds: Representation and Compression for VR/AR", ARXIV ID: 1610.00402, Published Oct. 3, 2016, pp. 1-28.
U.S. Appl. No. 17/804,477, filed May 27, 2022, Khaled Mammou, et al.
Jingming Dong, "Optimal Visual Representation Engineering and Learning for Computer Vision", Doctoral Dissertation, UCLA, 2017, pp. 1-151.
Khaled Mammou et al, "Working Draft of Point Cloud Coding for Category 2 (Draft 1)", dated Apr. 2018, pp. 1-38.
Khaled Mammou et al , "Input Contribution", dated Oct. 8, 2018, pp. 1-42.
Benjamin Bross et al, "High Effeciency Video Coding (HEVC) Text Specification Draft 8", dated Jul. 23, 2012, pp. 1-86.
JunTaek Park et al, "Non-Overlapping Patch Packing in TMC2 with HEVC-SCC", dated Oct. 8, 2018, pp. 1-6.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Cohen Robert A et al, "Point Cloud Attribute Compression Using 3-D Intra Prediction and Shape-Adaptive Transforms", dated Mar. 30, 2016, pp. 141-150.
Tim Golla et al., "Real-time Point Cloud Compression", IROS, 2015, pp. 1-6.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.
David Flynn, "International Organisation for Standardisation Organisation International De Normalisation ISO/IEC JTC1/SC29/WG11 Coding of Moving Pictures and Audio", dated Apr. 2020. pages 1-9.
Miska M. Hannuksela, "On Slices and Tiles", JVET Meeting, The Joint Video Exploration Team of ISO/IEC, Sep. 25, 2018, pp. 1-3.
""""G-PCC Future Enchancements"""", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30".
"David Flynn et al., """G-PCC: A hierarchical geometry slice structure""", MPEG Meeting, Retrieved from http://phenix.intevry.fr/mpeg/doc_end_user/documents/131_Online/wg11/m54677-v1-m54677_vl.zip, Jun. 28, 2020, pp. 1-9".
Bin Lu, et al., """Massive Point Cloud Space Management Method Based on Octree-Like Encoding""", Arabian Journal forScience Engineering, https://doi.org/10.1007/s13369-019-03968-7, 2019, pp. 1-15.
Wikipedia, """k-d tree""", Aug. 1, 2019, Retrieved from URL: https://en.wikipedia.org/w.indec.php?title=Kd_tree&oldid=908900837, pp. 1-9.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.

\* cited by examiner

POINT CLOUD COMPRESSION USING VIDEO ENCODING WITH TIME CONSISTENT PATCHES

PRIORITY CLAIM

This application claims benefit of priority to U.S. Provisional Application Ser. No. 62/907,423, entitled "Point Cloud Compression Using Video Encoding with Time Consistent Patches", filed Sep. 27, 2019, and which is incorporated herein by reference in its entirety. This application also claims benefit of priority to U.S. Provisional Application Ser. No. 62/964,051, entitled "Point Cloud Compression Using Video Encoding with Time Consistent Patches", filed Jan. 21, 2020, and which is incorporated herein by reference in its entirety.

BACKGROUND

Technical Field

This disclosure relates generally to compression and decompression of point clouds comprising a plurality of points, each having associated spatial information and attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a system includes one or more sensors configured to capture points that collectively make up a point cloud, wherein each of the points comprises spatial information identifying a spatial location of the respective point and attribute information defining one or more attributes associated with the respective point.

In some embodiments, a system further includes an encoder configured to compress the attribute and/or spatial information of the points. To compress the attribute and/or spatial information, the encoder is configured to determine, for the point cloud, a plurality of patches, each corresponding to portions of the point cloud. The encoder is also configured to, for each patch, generate a patch image comprising the set of points corresponding to the patch projected onto a patch plane and generate another patch image comprising geometry information, such as depth information, for the set of points corresponding to the patch, wherein the geometry information comprises depths of the points in a direction perpendicular to the patch plane.

For example, a geometry patch image corresponding to a patch projected onto a patch plane may depict the points of the point cloud included in the patch in two directions, such as an X and Y direction. The points of the point cloud may be projected onto a patch plane approximately perpendicular to a normal vector, normal to a surface of the point cloud at the location of the patch. Also, for example, the geometry patch image comprising depth information for the set of points included in the patch may depict depth information, such as depth distances in a Z direction. To depict the depth information, the geometry patch image may include a parameter that varies in intensity based on the depth of points in the point cloud at a particular location in the patch image. For example, the geometry patch image depicting depth information may have a same shape as the attribute patch image representing attributes of points projected onto the patch plane. However, the geometry information patch image may be an image comprising image attributes, such as one or more colors, that vary in intensity based on depth, wherein the intensity of the one or more image attributes corresponds to a depth of a corresponding point of the point cloud at a location in the geometry patch image where the image attribute is displayed in the geometry patch image depicting depth. For example, points that are closer to the patch plane may be encoded as darker values in the patch image depicting depth and points that are further away from the patch plane may be encoded as lighter values in the patch image depicting depth, for example in a monochromatic patch image depicting depth. Thus, the depth information patch image when aligned with other patch images representing attribute values for points projected onto the patch plane may indicate the relative depths of the points projected onto the patch plane, based on respective image attribute intensities at locations in the geometry patch image that correspond to locations of the points in the other patch images comprising point cloud points projected onto the patch plane.

In some embodiments, the encoder may generate patches for a point cloud that changes over time independently at each of a plurality of moments in time. For example, for a point cloud that represents a person walking, the encoder may independently generate patches comprising portions of the person projected on to patch planes that are determined at different points in time irrespective to patches determined for other points in time.

Alternatively, in some embodiments, the encoder may generate patches for a cloud that changes over time based on a mapping of the points as the move from one moment in time to another. In such embodiments, time-consistent patches may be generated, wherein a same time consistent patch may be used for multiple version of the point cloud at different moments in time. Also, the time-consistent patch may retain the same patch size and orientation relative to the point cloud across the multiple moments in time.

The encoder is further configured to pack generated patch images (including a geometry patch image and one or more additional patch images for one or more other attributes such as colors, textures, reflectances, etc.) for each of the determined patches into one or more image frames. For example, the encoder may utilize a video encoding component in accordance with the High Efficiency Video Coding (HEVC/H.265) standard or other suitable standards such as, the Advanced Video Coding (AVC/H.264) standard, the AOMedia Video 1 (AV1) video coding format produced by the Alliance for Open Media (AOM), etc. In some embodiments, the encoder may utilize an image encoder in accordance with a Motion Picture Experts Group (MPEG), a Joint Photography Experts Group (JPEG) standard, an International Telecommunication Union-Telecommunication standard (e.g. ITU-T standard), etc.

In some embodiments, a decoder is configured to receive one or more encoded image frames comprising patch images for a plurality of patches of a compressed point cloud, wherein, for each patch, the one or more encoded image frames comprise: a patch image comprising a set of points of the patch projected onto a patch plane and a patch image comprising depth information for the set of points of the patch, wherein the depth information indicates depths of the points of the patch in a direction perpendicular to the patch plane. In some embodiments, a depth patch image may be packed into an image frame with other attribute patch images. For example, a decoder may receive one or more image frames comprising packed patch images as generated by the encoder described above. In some embodiments, the one or more image frames may include time-consistent patches. In some embodiments, a common occupancy map may be signaled for a sequence of patch images that use the same time-consistent patches. In some embodiments, at least one of the image frames may have been down-scaled at an encoder, and the decoder may up-scale the down-scaled image frame, in a 2D video domain.

The decoder is further configured to video decode the one or more video encoded image frames comprising the patch images. In some embodiments, the decoder may utilize a video decoder in accordance with the High Efficiency Video Coding (HEVC) standard or other suitable standards such as, the Advanced Video Coding (AVC) standard, the AOMedia Video 1 (AV1) video coding format, etc. In some embodiments, the decoder may utilize an image decoder in accordance with a Motion Picture Experts Group (MPEG) or a Joint Photography Experts Group (JPEG) standard, etc.

The decoder is further configured to receive or determine relationship information indicating relationships between the respective attribute patch images, depth patch images, and/or image frames. For example, the decoder may receive relationship information in a compressed point cloud file, wherein the relationship information was determined by an encoder. Also, in some embodiments, the decoder may determine relationship information based on information included in a compressed point cloud file, such as an occupancy map and/or auxiliary information for the compressed point cloud. In some embodiments, the decoder may utilize the received or determined relationship information to adjust one or more parameters used to video decode the video encoded image frames.

The decoder is further configured to determine, for each patch, spatial information for the set of points of the patch based, at least in part, on the attribute patch image comprising the set of points of the patch projected onto the patch plane and the geometry patch image comprising the depth information for the set of points of the patch, and generate a reconstructed version of the compressed point cloud based, at least in part, on the determined spatial information for the plurality of patches and the attribute information included in the patches.

In some embodiments, a non-transitory computer-readable medium stores program instructions that, when executed by one or more processors, cause the one or more processors to implement an encoder as described herein to compress geometry and attribute information of a point cloud.

In some embodiments, a non-transitory computer-readable medium stores program instructions that, when executed by one or more processors, cause the one or more processors to implement a decoder as described herein to decompress geometry and attribute information of a point cloud.

Figure 1:
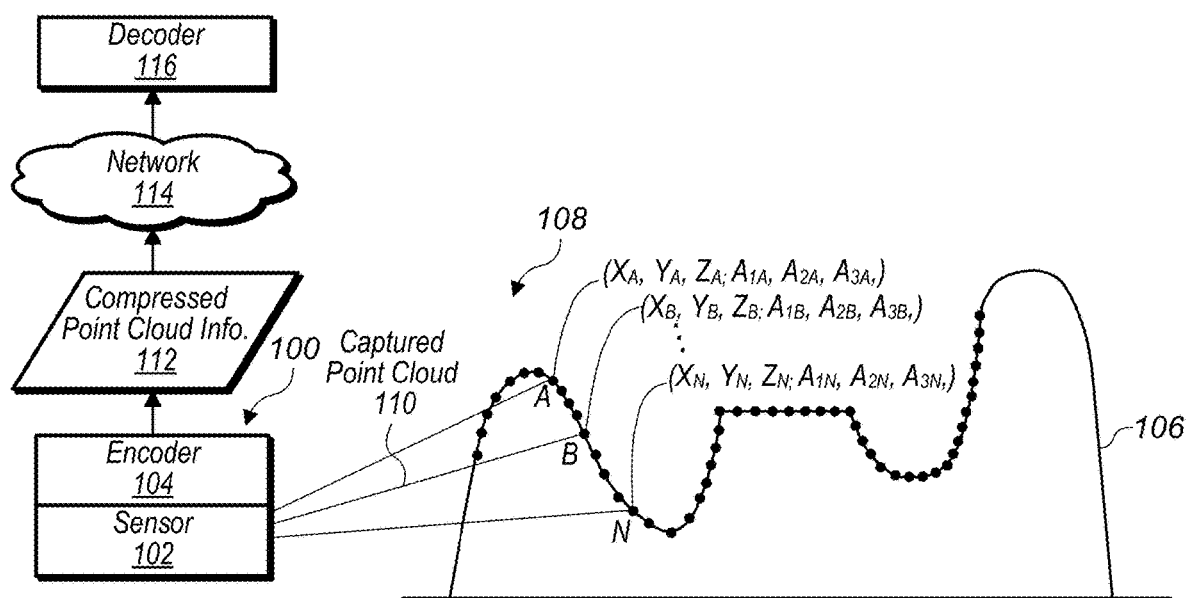
FIG. 1 illustrates a system comprising a sensor that captures information for points of a point cloud and an encoder that compresses spatial information and attribute information of the point cloud, where the compressed spatial and attribute information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute and/or spatial information of a point cloud file such that the point cloud file may be stored and transmitted more quickly than non-compressed point clouds and in a manner that the point cloud file may occupy less storage space than non-compressed point clouds. In some embodiments, compression of attributes of points in a point cloud may enable a point cloud to be communicated over a network in real-time or in near real-time. For example, a system may include a sensor that captures attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more sets of point cloud data comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud data from the remote server based on user manipulations of the displays, and the point cloud data may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, texture attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

Example System Arrangement

FIG. 1 illustrates a system comprising a sensor that captures information for points of a point cloud and an encoder that compresses attribute information of the point cloud, where the compressed attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate sets of data.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Example Intra-3D Frame Encoder

Figure 2A:
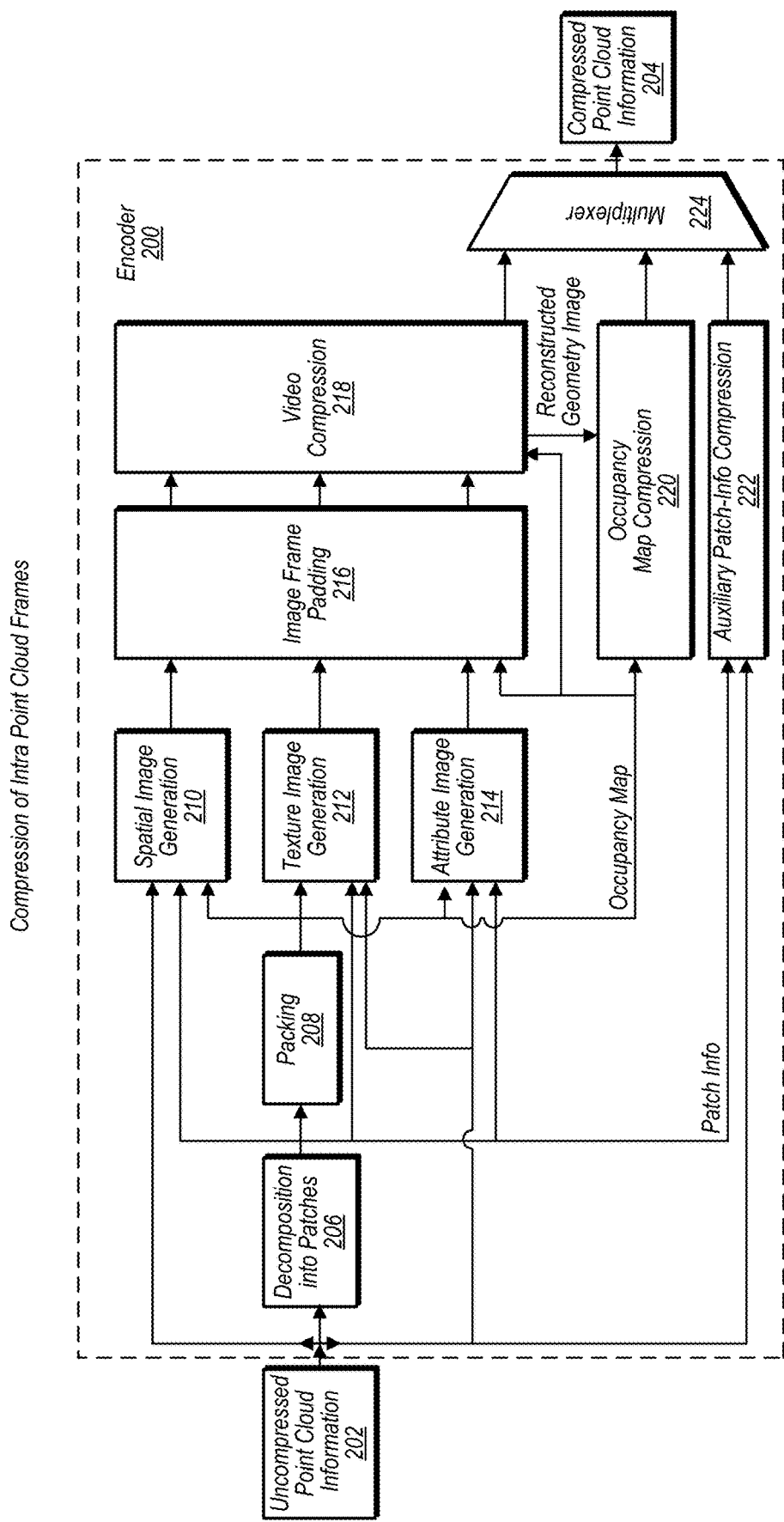
FIG. 2A illustrates components of an encoder for encoding intra point cloud frames, according to some embodiments.

FIG. 2A illustrates components of an encoder for intra encoding 3D point cloud frames, according to some embodiments. In some embodiments, the encoder described above in regard to FIG. 1 may operate in a similar manner as encoder 200 described in FIG. 2A and encoder 250 described in FIG. 2C.

The encoder 200 receives uncompressed point cloud 202 and generates compressed point cloud information 204. In some embodiments, an encoder, such as encoder 200, may receive the uncompressed point cloud 202 from a sensor, such as sensor 102 illustrated in FIG. 1, or, in some embodiments, may receive the uncompressed point cloud 202 from another source, such as a graphics generation component that generates the uncompressed point cloud in software, as an example.

In some embodiments, an encoder, such as encoder 200, includes decomposition into patches module 206, packing module 208, spatial image generation module 210, texture image generation module 212, and attribute information generation module 214. In some embodiments, an encoder, such as encoder 200, also includes image frame padding module 216, video compression module 218 and multiplexer 224. In addition, in some embodiments an encoder, such as encoder 200, may include an occupancy map compression module, such as occupancy map compression module 220, and an auxiliary patch information compression module, such as auxiliary patch information compression module 222. In some embodiments, an encoder, such as encoder 200, converts a 3D point cloud into an image-based representation along with some meta data (e.g., occupancy map and patch info) necessary to convert the compressed point cloud back into a decompressed point cloud.

In some embodiments, the conversion process decomposes the point cloud into a set of patches (e.g., a patch is defined as a contiguous subset of the surface described by the point cloud), which may be overlapping or not, such that each patch may be described by a depth field with respect to a plane in 2D space. More details about the patch decomposition process are provided above with regard to FIGS. 3A-3C.

After or in conjunction with the patches being determined for the point cloud being compressed, a 2D sampling process is performed in planes associated with the patches. The 2D sampling process may be applied in order to approximate each patch with a uniformly sampled point cloud, which may be stored as a set of 2D patch images describing the geometry/texture/attributes of the point cloud at the patch location. The "Packing" module 208 may store the 2D patch images associated with the patches in a single (or multiple) 2D images, referred to herein as "image frames" or "video image frames." In some embodiments, a packing module, such as packing module 208, may pack the 2D patch images such that the packed 2D patch images do not overlap (even though an outer bounding box for one patch image may overlap an outer bounding box for another patch image). Also, the packing module may pack the 2D patch images in a way that minimizes non-used images pixels of the image frame.

In some embodiments, "Geometry/Texture/Attribute generation" modules, such as modules 210, 212, and 214, generate 2D patch images associated with the geometry/texture/attributes, respectively, of the point cloud at a given patch location. As noted before, a packing process, such as performed by packing module 208, may leave some empty spaces between 2D patch images packed in an image frame. Also, a padding module, such as image frame padding module 216, may fill in such areas in order to generate an image frame that may be suited for 2D video and image codecs.

In some embodiments, an occupancy map (e.g., binary information describing for each pixel or block of pixels whether the pixel or block of pixels are padded or not) may be generated and compressed, for example by occupancy map compression module 220. The occupancy map may be sent to a decoder to enable the decoder to distinguish between padded and non-padded pixels of an image frame.

Note that other metadata associated with patches may also be sent to a decoder for use in the decompression process. For example, patch information indicating sizes and shapes of patches determined for the point cloud and packed in an image frame may be generated and/or encoded by an auxiliary patch-information compression module, such as auxiliary patch-information compression module 222. In some embodiments one or more image frames may be encoded by a video encoder, such as video compression module 218. In some embodiments, a video encoder, such as video compression module 218, may operate in accordance with the High Efficiency Video Coding (HEVC) standard or other suitable video encoding standard. In some embodiments, encoded video images, encoded occupancy map information, and encoded auxiliary patch information may be multiplexed by a multiplexer, such as multiplexer 224, and provided to a recipient as compressed point cloud information, such as compressed point cloud information 204.

In some embodiments, an occupancy map may be encoded and decoded by a video compression module, such as video compression module 218. This may be done at an encoder, such as encoder 200, such that the encoder has an accurate representation of what the occupancy map will look like when decoded by a decoder. Also, variations in image frames due to lossy compression and decompression may be accounted for by an occupancy map compression module, such as occupancy map compression module 220, when determining an occupancy map for an image frame.

Example 3D Intra-Frame Decoder

Figure 2B:
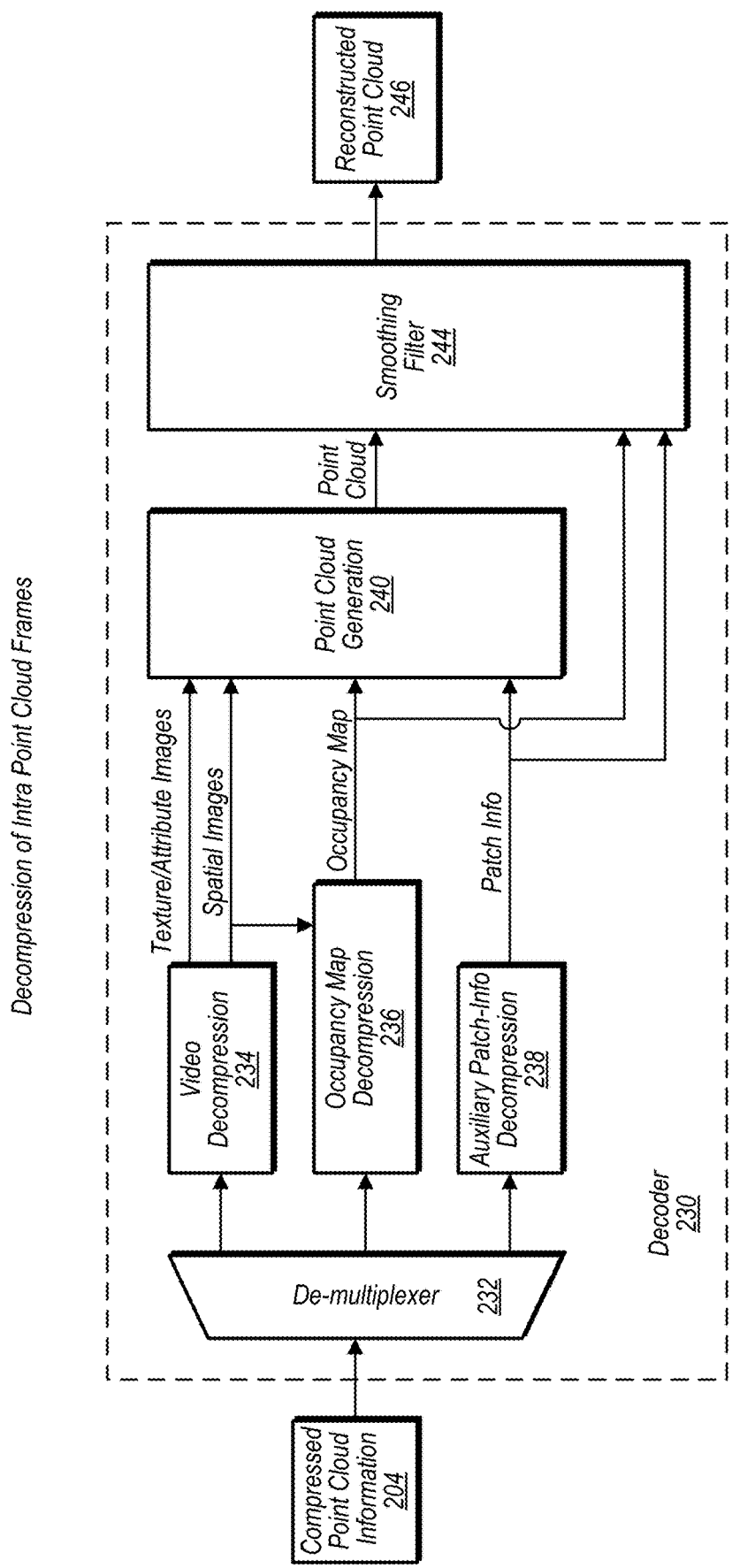
FIG. 2B illustrates components of a decoder for decoding intra point cloud frames, according to some embodiments.

FIG. 2B illustrates components of a decoder for decoding point cloud frames, according to some embodiments. Decoder 230 receives compressed point cloud information 204, which may be the same compressed point cloud information 204 generated by encoder 200. Decoder 230 generates reconstructed point cloud 246 based on receiving the compressed point cloud information 204.

In some embodiments, a decoder, such as decoder 230, includes a de-multiplexer 232, a video decompression module 234, an occupancy map decompression module 236, and an auxiliary patch-information decompression module 238. Additionally a decoder, such as decoder 230 includes a point cloud generation module 240, which reconstructs a point cloud based on patch images included in one or more image frames included in the received compressed point cloud information, such as compressed point cloud information 204. In some embodiments, a decoder, such as decoder 203, further comprises a smoothing filter, such as smoothing filter 244. In some embodiments, a smoothing filter may smooth incongruences at edges of patches, wherein data included in patch images for the patches has been used by the point cloud generation module to recreate a point cloud from the patch images for the patches. In some embodiments, a smoothing filter may be applied to the pixels located on the patch boundaries to alleviate the distortions that may be caused by the compression/decompression process.

Example 3D Inter-Frame Encoder

Figure 2C:
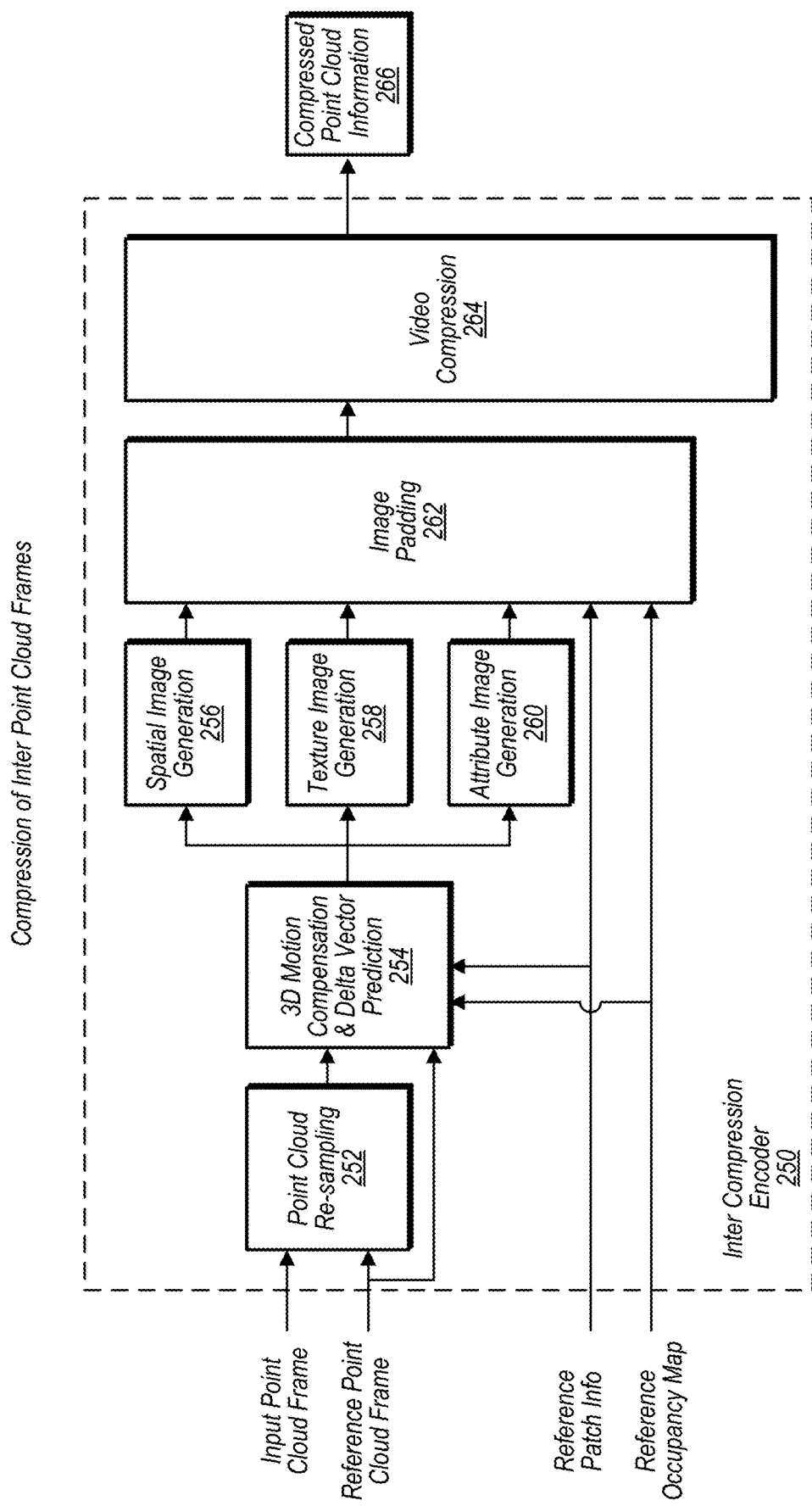
FIG. 2C illustrates components of an encoder for encoding inter point cloud frames, according to some embodiments.

FIG. 2C illustrates components of an encoder for inter encoding 3D point cloud frames, according to some embodiments. A 3D inter point cloud encoder, such as inter point cloud encoder 250, may encode a 3D version of a point cloud at a particular moment in time (e.g an image frame), while considering one or more previously encoded/decoded versions of the point cloud at other moments in time (e.g. other image frames) as reference frames.

In some embodiments, an encoder, such as encoder 250, includes a point cloud re-sampling module 252, a 3-D motion compensation and delta vector prediction module 254, a spatial image generation module 256, a texture image generation module 258, and an attribute image generation module 260. In some embodiments, an encoder, such as encoder 250, may also include an image padding module 262 and a video compression module 264. An encoder, such as encoder 250, may generate compressed point cloud information, such as compressed point cloud information 266. In some embodiments, the compressed point cloud information may reference point cloud information previously encoded by the encoder, such as information from or derived from one or more reference image frames. In this way an encoder for inter point cloud frames, such as encoder 250, may generate more compact compressed point cloud information by not repeating information included in a reference image frame, and instead communicating differences between the reference frames and a current state of the point cloud.

In some embodiments, an encoder, such as encoder 250, may be combined with or share modules with an intra point cloud frame encoder, such as encoder 200. In some embodiments, a point cloud re-sampling module, such as point cloud re-sampling module 252, may resample points in an input point cloud image frame in order to determine a one-to-one mapping between points in patches of the current image frame and points in patches of a reference image frame for the point cloud. In some embodiments, a 3D motion compensation & delta vector prediction module, such as a 3D motion compensation & delta vector prediction module 254, may apply a temporal prediction to the geometry/texture/attributes of the resampled points of the patches. The prediction residuals may be stored into images, which may then be padded and compressed by using video/image codecs. In regard to spatial changes for points of the patches between the reference frame and a current frame, a 3D motion compensation & delta vector prediction module 254, may determine respective vectors for each of the points or segments of the point cloud, wherein the respective vectors indicate how the points or segments moved from the reference frame to the target frame (e.g. a current frame). A 3D motion compensation & delta vector prediction module 254, may then encode the motion vectors using different image parameters. For example, changes in the X direction for a point may be represented by an amount of red included at the point in a patch image that includes the point. In a similar manner, changes in the Y direction for a point may be represented by an amount of blue included at the point in a patch image that includes the point. Also, in a similar manner, changes in the Z direction for a point may be represented by an amount of green included at the point in a patch image that includes the point. In some embodiments, other characteristics of an image included in a patch image may be adjusted to indicate motion of points included in the patch between a reference frame for the patch and a current frame for the patch.

Example 3D Inter-Frame Decoder

Figure 2D:
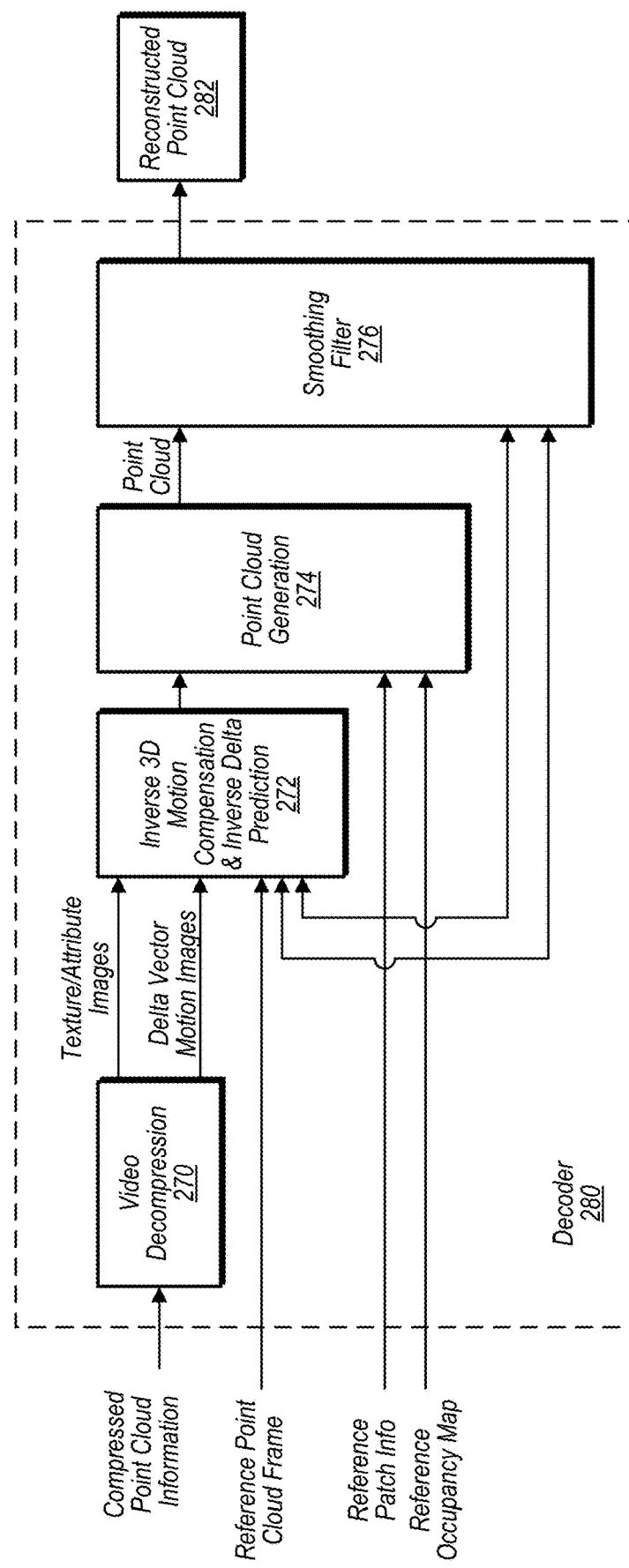
FIG. 2D illustrates components of a decoder for decoding inter point cloud frames, according to some embodiments.

FIG. 2D illustrates components of a decoder for decoding cloud frames, according to some embodiments. In some embodiments, a decoder, such as decoder 280, includes a video decompression module 270, an inverse 3D motion compensation and inverse delta prediction module 272, a point cloud generation module 274, and a smoothing filter 276. In some embodiments, a decoder, such as decoder 280 may be combined with a decoder, such as decoder 230, or may share some components with the decoder, such as a video decompression module and/or smoothing filter. In decoder 280, the video/image streams are first decoded, then an inverse motion compensation and delta prediction procedure may be applied. The obtained images are then used in order to reconstruct a point cloud, which may be smoothed as described previously to generate a reconstructed point cloud 282.

Segmentation Process

Figure 3A:
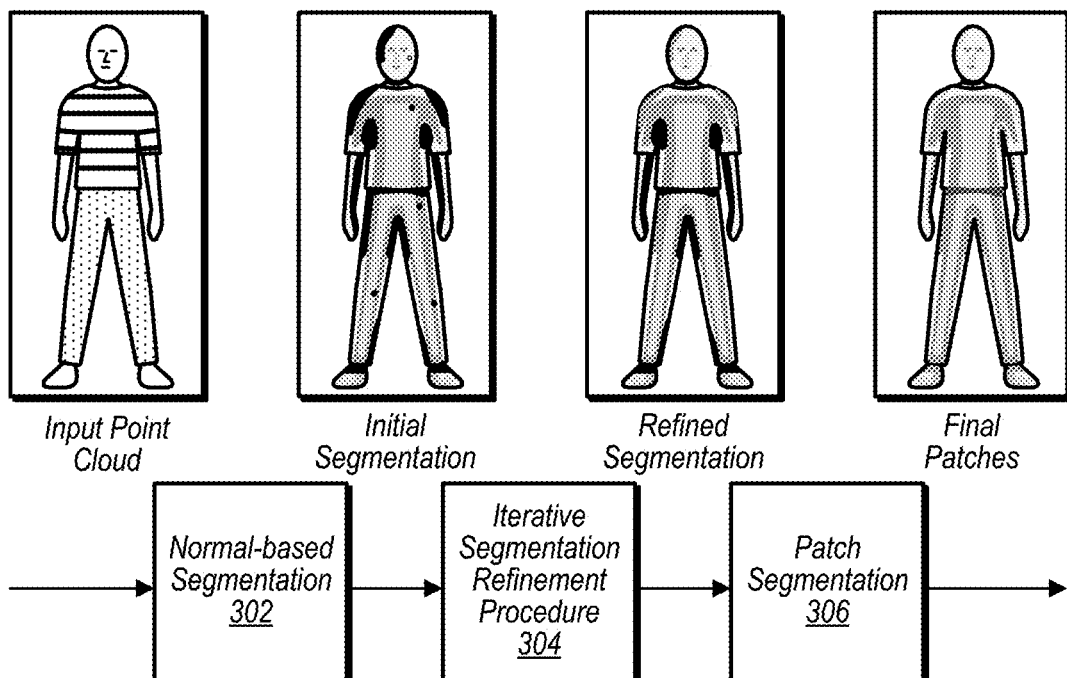
FIG. 3A illustrates an example patch segmentation process, according to some embodiments.

FIG. 3A illustrates an example segmentation process for determining patches for a point cloud, according to some embodiments. The segmentation process as described in FIG. 3A may be performed by a decomposition into patches module, such as decomposition into patches module 206. A segmentation process may decompose a point cloud into a minimum number of patches (e.g., a contiguous subset of the surface described by the point cloud), while making sure that the respective patches may be represented by a depth field with respect to a patch plane. This may be done without a significant loss of shape information.

In some embodiments, a segmentation process comprises:

Letting point cloud PC be the input point cloud to be partitioned into patches and $\{P(0), P(1) \ldots , P(N-1)\}$ be the positions of points of point cloud PC.

In some embodiments, a fixed set $D=\{D(0), D(1), \ldots , D(K-1)\}$ of K 3D orientations is pre-defined. For instance, D may be chosen as follows $D=\{(1.0, 0.0, 0.0), (0.0, 1.0, 0.0), (0.0, 0.0, 1.0), (-1.0, 0.0, 0.0), (0.0, -1.0, 0.0), (0.0, 0.0, -1.0)\}$ In some embodiments, the normal vector to the surface at every point P(i) is estimated. Any suitable algorithm may be used to determine the normal vector to the surface. For instance, a technique could include fetching the set H of the "N" nearest points of P(i), and fitting a plane Π(i) to H(i) by using principal component analysis techniques. The normal to P(i) may be estimated by taking the normal V(i) to Π(i). Note that "N" may be a user-defined parameter or may be found by applying an optimization procedure. "N" may also be fixed or adaptive. The normal values may then be oriented consistently by using a minimum-spanning tree approach.

Normal-based Segmentation: At 302, an initial segmentation S0 of the points of point cloud PC may be obtained by associating respective points with the direction D(k) which maximizes the score $\langle V(i)|D(k)\rangle$, where $\langle \bullet|\bullet \rangle$ is the canonical dot product of R3. Pseudo code is provided below.

```
for (i = 0; i < pointCount; ++i) {
    clusterIndex = 0;
    bestScore =⟨ V(i)|D(0)⟩ ;
    for(j = 1; j < K; ++j) {
        score =⟨ V(i)|D(j)⟩ ;
        if (score > bestScore) {
            bestScore = score;
            clusterIndex = j;
        }
    }
    partition[i] = clusterIndex;
}
```

Iterative segmentation refinement: At 302, an iterative segmenation refinement process may be performed. Note that segmentation S0 associates respective points with the plane Π(i) that best preserves the geometry of its neighborhood (e.g. the neighborhood of the segment). In some circumstances, segmentation S0 may generate too many small connected components with irregular boundaries, which may result in poor compression performance. In order to avoid such issues, the following iterative segmentation refinement procedure may be applied:

1. An adjacency graph A may be built by associating a vertex V(i) to respective points P(i) of point cloud PC and by adding R edges $\{E(i,j(0)), \ldots , E(i,j(R-1)\}$ connecting vertex V(i) to its nearest neighbors $\{V(j(0)), V(j(1)), \ldots , V(j(R-1))\}$. More precisely, $\{V(j(0)), V(j(1)), \ldots , V(j(R-1))\}$ may be the vertices associated with the points $\{P(j(0)), P(j(1)), \ldots , P(j(R-1))\}$, which may be the nearest neighbors of P(i). Note that R may be a user-defined parameter or may be found by applying an optimization procedure. It may also be fixed or adaptive.

2. At each iteration, the points of point cloud PC may be traversed and every vertex may be associated with the direction D (k) that maximizes $$\left(\langle \overrightarrow{V}(i)|D(k)\rangle + \frac{\lambda}{R}|\zeta(i)|\right),$$

where $|\zeta(i)|$ is the number of the R-nearest neighbors of V(i) belonging to the same cluster and λ is a parameter controlling the regularity of the produced patches. Note that the parameters λ and R may be defined by the user or may be determined by applying an optimization procedure. They may also be fixed or adaptive. In some embodiments, a "user" as referred to herein may be an engineer who configured a point cloud compression technique as described herein to one or more applications.

3. An example of pseudo code is provided below

```
for(l = 0; l < iterationCount; ++l) {
    for(i = 0; i < pointCount; ++i) {
        clusterIndex = partition[i];
        bestScore = 0.0;
        for(k = 0; k < K; ++k) {
            score = ⟨V(i)|D(k)⟩ ;
            for(j ∈ {j(0), j(1), . . . , j(R − 1)}) {
                if (k == partition[j]) { score += λ/R;

}
            }
            if (score > bestScore) {
                bestScore = score;
                clusterIndex = k;
            }
        }
        partition[i] = clusterIndex;
    }
}
```

\*In some embodiments, the pseudo code shown above may further include an early termination step. For example, if a score that is a particular value is reached, or if a difference between a score that is reached and a best score only changes by a certain amount or less, the search could be terminated early. Also, the search could be terminated if after a certain number of iterations (l=m), the clusterindex does not change.

Patch segmentation: In some embodiments, the patch segmentation procedure 306 further segments the clusters detected in the previous steps into patches, which may be represented with a depth field with respect to a projection plane. The approach proceeds as follows, according to some embodiments:

1. First, a cluster-based adjacency graph with a number of neighbors R' is built, while considering as neighbors only the points that belong to the same cluster. Note that R' may be different from the number of neighbors R used in the previous steps.
2. Next, the different connected components of the cluster-based adjacency graph are extracted. Only connected components with a number of points higher than a parameter a are considered. Let CC={CC(0), CC(1), . . . , CC(M-1)} be the set of the extracted connected components.
3. Respective connected component CC(m) inherits the orientation D(m) of the cluster it belongs to. The points of CC(m) are then projected on a projection plane having as normal the orientation D(m), while updating a depth map, which records for every pixel the depth of the nearest point to the projection plane.
4. An approximated version of CC(m), denoted C'(m), is then built by associating respective updated pixels of the depth map with a 3D point having the same depth. Let PC' be the point cloud obtained by the union of reconstructed connected components {CC'(0), CC'(1), . . . , CC'(M-1)}
5. Note that the projection reconstruction process may be lossy and some points may be missing. In order to detect such points, every point P(i) of point cloud PC may be checked to make sure it is within a distance lower than a parameter δ from a point of PC'. If this is not the case, then P(i) may be marked as a missed point and added to a set of missed points denoted MP.
6. The steps 2-5 are then applied to the missed points MP. The process is repeated until MP is empty or CC is empty. Note that the parameters δ and a may be defined by the user or may be determined by applying an optimization procedure. They may also be fixed or adaptive.
7. A filtering procedure may be applied to the detected patches in order to make them better suited for compression. Example filter procedures may include:
    a. A smoothing filter based on the geometry/texture/attributes of the points of the patches (e.g., median filtering), which takes into account both spatial and temporal aspects.
    b. Discarding small and isolated patches.
    c. User-guided filtering.
    d. Other suitable smoothing filter techniques.

Packing

In some embodiments, depth maps associated with patches, also referred to herein as "depth patch images" or "geometry patch images," such as those described above, may be packed into a 2D image frame. Also, attribute patch images and/or texture patch images may be packed into a 2D image frame. For example, a packing module, such as packing module 208, may pack depth patch images generated by a spatial image generation module, such as spatial image generation module 210, into a 2D image frame; pack texture patch images generated by a texture image generation module, such as texture image generation module 212, into a 2D image frame; and pack attribute patch images generated by an attribute image generation module, such as attribute image generation module 214, into a 2D image frame. The maps, or patch images, may be packed such that (A) no non-overlapping block of T×T pixels contains patch information from two different patches and such that (B) a size of the generated image frame is minimized.

In some embodiments, packing comprises the following steps:
    a. The patches are sorted by height and then by width. The patches are then inserted in image frame (I) one after the other in that order. At each step, the pixels of image frame (I) are traversed in raster order, while checking if the current patch could be inserted under the two conditions (A) and (B) described above. If it is not possible then the height of (I) is doubled.
    b. This process is iterated until all the patches are inserted.

In some embodiments, the packing process described above may be applied to pack a subset of the patches inside multiples tiles of an image frame or multiple image frames. This may allow patches with similar/close orientations based on visibility according to the rendering camera position to be stored in the same image frame/tile, to enable view-dependent streaming and/or decoding. This may also allow parallel encoding/decoding.

In some embodiments, the packing process can be considered a bin-packing problem and a first decreasing strategy as described above may be applied to solve the bin-packing problem. In other embodiments, other methods such as the modified first fit decreasing (MFFD) strategy may be applied in the packing process.

In some embodiments, if temporal prediction is used, such as described for inter compression encoder 250, such an optimization may be performed with temporal prediction/encoding in addition to spatial prediction/encoding. Such consideration may be made for the entire video sequence or per group of pictures (GOP). In the latter case additional constraints may be specified. For example, a constraint may be that the resolution of the image frames should not exceed a threshold amount. In some embodiments, additional temporal constraints may be imposed, even if temporal prediction is not used, for example such as that a patch corresponding to a particular object view is not moved more than x number of pixels from previous instantiations.

Figure 3B:
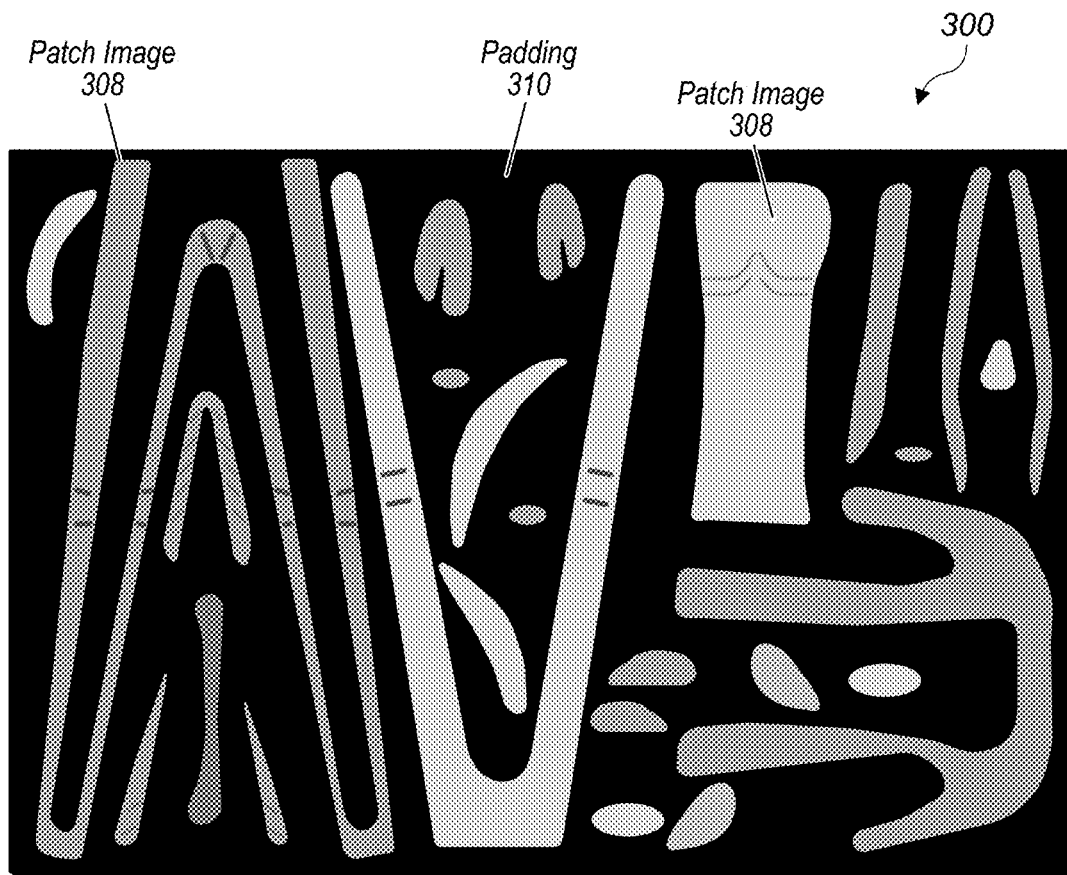
FIG. 3B illustrates an example image frame comprising packed patch images and padded portions, according to some embodiments.

FIG. 3B illustrates an example image frame comprising packed patch images and padded portions, according to some embodiments. Image frame 300 includes patch images 308 packed into image frame 300 and also includes padding 310 in space of image frame 300 not occupied by patch images. In some embodiments, padding, such as padding 310, may be determined so as to minimize incongruences between a patch image and the padding. For example, in some embodiments, padding may construct new pixel blocks that are replicas of, or are to some degree similar to, pixel blocks that are on the edges of patch images. Because an image and/or video encoder may encode based on differences between adjacent pixels, such an approach may reduce the number of bytes required to encode an image frame comprising of patch images and padding, in some embodiments.

In some embodiments, the patch information may be stored in the same order as the order used during the packing, which makes it possible to handle overlapping 2D bounding boxes of patches. Thus a decoder receiving the patch information can extract patch images from the image frame in the same order in which the patch images were packed into the image frame. Also, because the order is known by the decoder, the decoder can resolve patch image bounding boxes that overlap.

Figure 4:
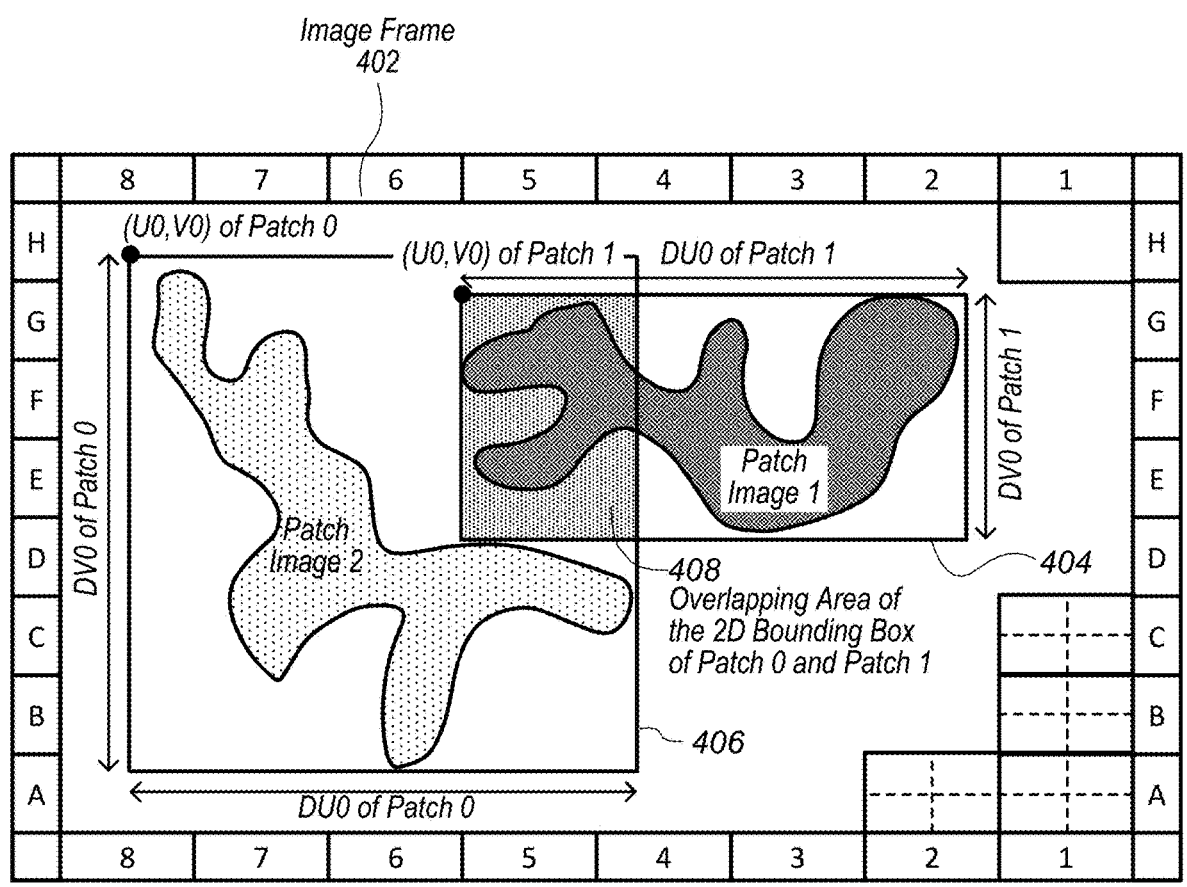
FIG. 4 illustrates an example image frame comprising patch portions and padded portions, according to some embodiments.

FIG. 4 illustrates an example image frame 402 with overlapping patches, according to some embodiments. For example FIG. 4 shows an example image frame 402 with two patches (patch image 1 and patch image 2) that have overlapping 2D bounding boxes 404 and 406 that overlap at area 408. In order to determine to which patch the T×T blocks in the area 408 belong, the order of the patches may be considered. For example, the T×T block 404 may belong to the last encoded patch. This may be because in the case of an overlapping patch, a later placed patch is placed such that it overlaps with a previously placed patch. By knowing the placement order it can be resolved that areas of overlapping bounding boxes go with the latest placed patch. In some embodiments, the patch information is predicted and encoded (e.g., with an entropy/arithmetic encoder). Also, in some embodiments bounding box sizes for the patches, U0, V0, DU0 and DV0 are encoded as multiples of T, where T is the block size used during the padding phase.

FIG. 4 also illustrates blocks of image frame 402, wherein the blocks may be further divided into sub-blocks. For example block A1, B1, C1, A2, etc. may be divided into multiple sub-blocks, and, in some embodiments, the sub-blocks may be further divided into smaller blocks. In some embodiments, a video compression module of an encoder, such as video compression module 218 or video compression module 264, may determine whether a block comprises active pixels, non-active pixels, or a mix of active and non-active pixels. The video compression module may budget fewer resources to compress blocks comprising non-active pixels than an amount of resources that are budgeted for encoding blocks comprising active pixels. In some embodiments, active pixels may be pixels that include data for a patch image and non-active pixels may be pixels that include padding. In some embodiments, a video compression module may sub-divide blocks comprising both active and non-active pixels, and budget resources based on whether sub-blocks of the blocks comprise active or non-active pixels. For example, blocks A1, B1, C1, A2 may comprise non-active pixels. As another example block E3 may comprise active pixels, and block B6, as an example, may include a mix of active and non-active pixels.

Example Segmentation Process for Time-Consistent Patches

In some embodiments, as described above, an encoder may determine patches for a point cloud independently, wherein patches are determined for each moment in time independent of patches determined for the point cloud at other moments in time. This approach may result in a simpler and less computationally burdensome patch segmentation process. However, a video encoder that encodes the packed images may not be able to take advantage of inter-prediction efficiencies of the video codec of the video encoder when such an approach is used. For example, video encoders may utilize a 2D video image inter-prediction process to encode data in subsequent image frames relative to reference frames, by encoding motion vectors for blocks of the image at a target frame at a target moment in time relative to a reference frame at a reference moment in time. However, when a time independent patch segmentation process is used, different patches (e.g. patches having different sizes and/or shapes) may be generated for each different moment in time. Furthermore, the patches may be packed into respective image frames in different orders or locations. This variability may frustrate a 2D video image inter-prediction process of a video encoder and may lead to large motion vectors and associated bit consumption, or may otherwise reduce compression efficiency of the video encoder.

In some embodiments, to address various issues associated with time independent patch segmentation, an encoder may alternatively utilize a time-consistent patch segmentation process that ensures patches packed in a sequence of image frames are time-consistent patches (e.g. the patches have the same (or similar) size and shape for different versions of the point cloud at different moments in time). Time-consistent patches may further be packed into image frames in a time-consistent order such that the time-consistent patches are placed in consistent locations in the respective image frames of the sequence of image frames.

Figure 6:
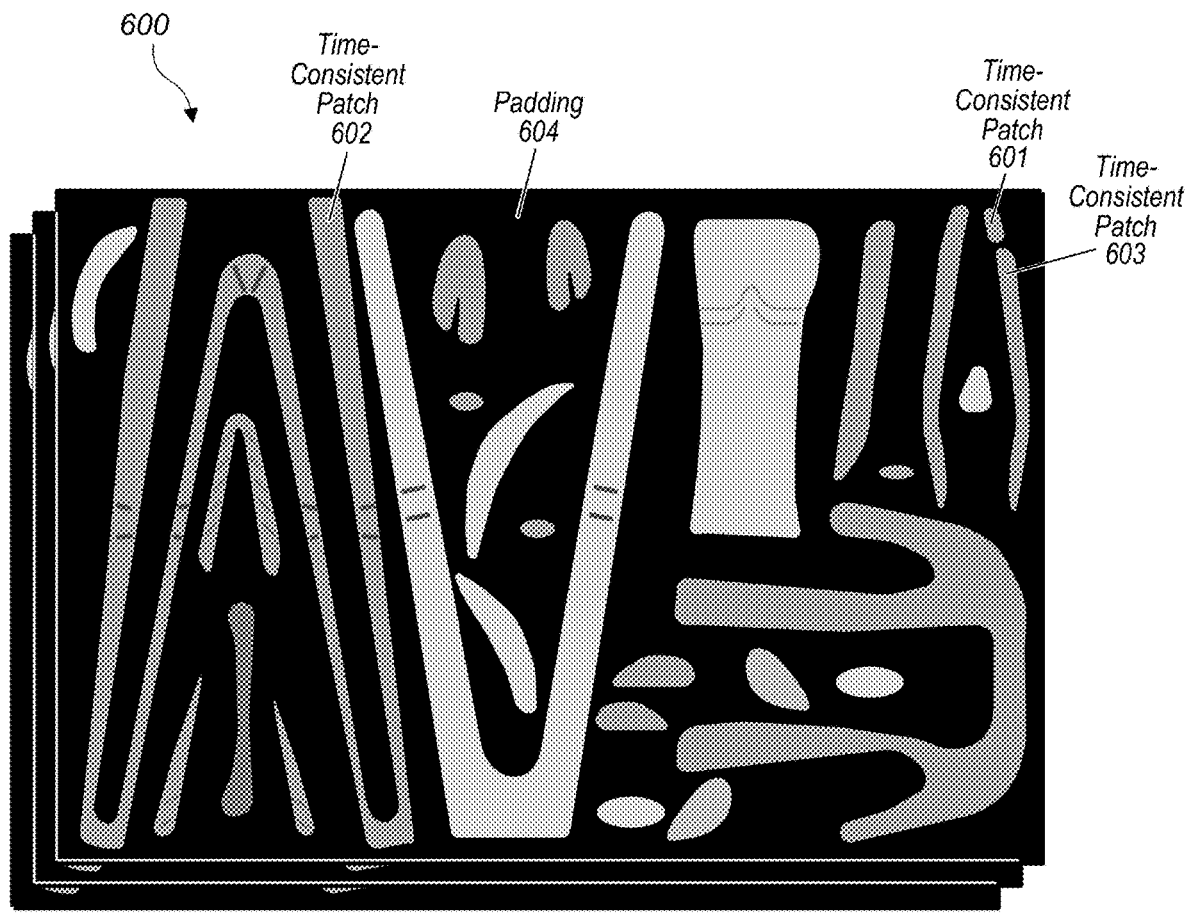
FIG. 6 illustrates an example sequence of image frames comprising time-consistent patches, according to some embodiments.

For example, FIG. 3B illustrates patch images 308 placed in a single image frame 300, with some parts of the image frame 300 being filled with padding 310 and other parts of the image being filled with patch images 308. In such embodiments, an encoder may independently determine patches for each image frame 300 for the same point cloud that has been slightly modified at different moments in time. This may result in patches of various sizes and shapes located at various locations in different ones of the image frames 300. In contrast, an encoder that implements time-consistent patches may determine time-consistent patches and pack the time consistent patches into the same or similar locations in multiple image frames of a sequence of image frames, wherein the patches have the same or similar sizes and shapes across the image frames of the sequence. For example as shown in FIG. 6, time-consistent patches may be packed in a time consistent order and may be included in a sequence of image frames 600. The sequence of image frames 600 may include patch images of the same (or similar) size and shape packed in the same (or similar) locations. For example, padding 604 and time consistent patches such as time consistent patch 601, 602, and 603 may be located in the same (or similar locations) in each image frame of sequence 600 and may have the same (or similar) sizes and shapes in each of the image frames of the sequence 600. However, the pixel values of the patches that indicate either geometry information or attribute information for the point cloud may vary across the time-consistent patches of sequence 600, even though the patches have the same size and shape. As discussed in more detail below, a previous one of patches 302 as shown in FIG. 3B may be replaced with multiple smaller patches, such as patches 601 and 603 that are time consistent. In some situations using multiple smaller patches instead of a larger patch may allow for patches that are consistent across multiple moments in time.

Figure 5:
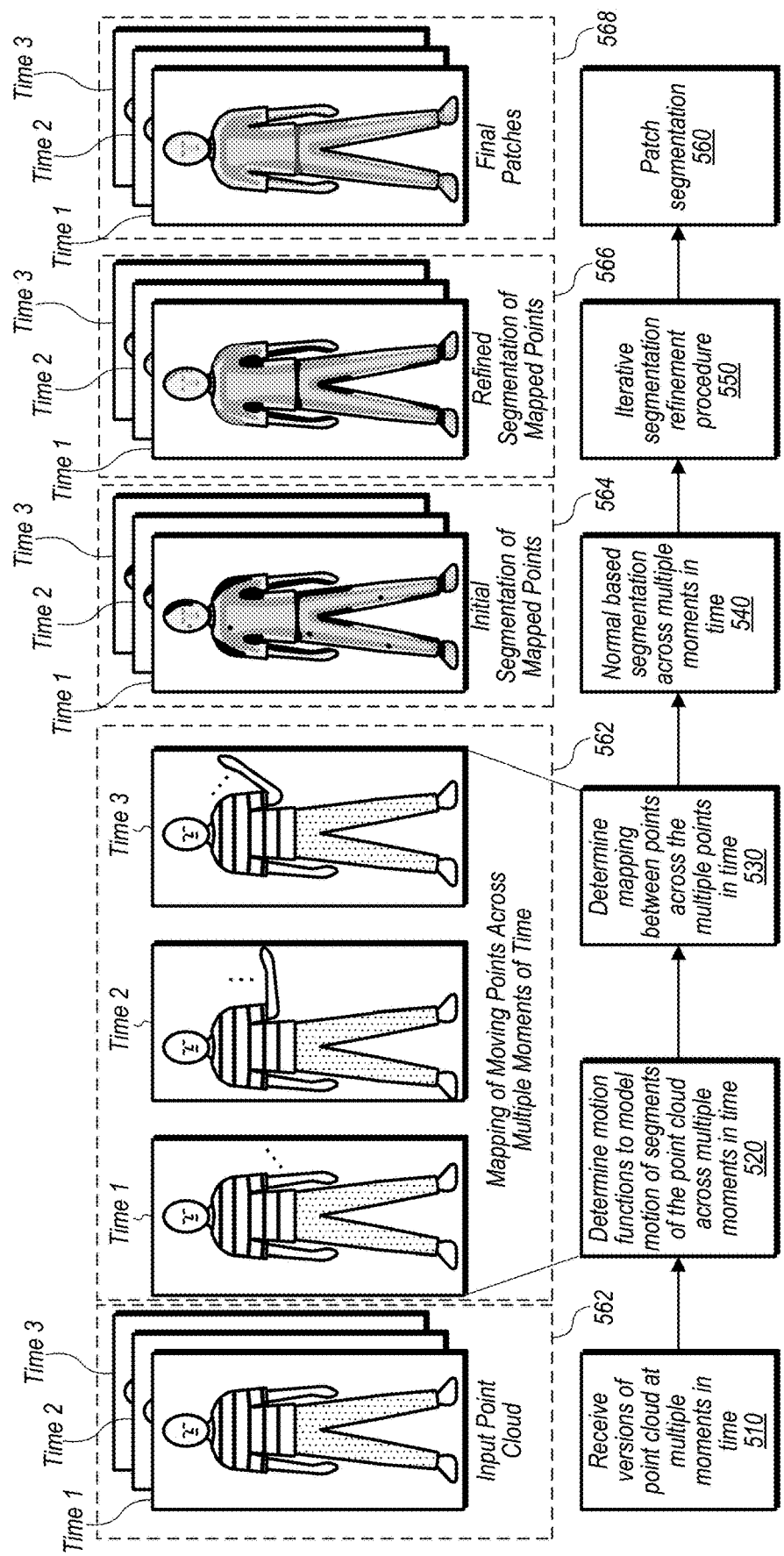
FIG. 5 illustrates an example patch segmentation process for generating time-consistent patches, according to some embodiments.

FIG. 5 illustrates an example patch segmentation process for generating time-consistent patches, according to some embodiments.

At 510, an encoder, such as any of the encoders described herein (e.g. encoder 200, 250, etc.) may receive a set of versions of a point cloud at multiple moments in time, such as set 562 showing versions of a point cloud at times 1, 2, and 3. The encoder may then perform steps 510 through 560 to generate time consistent patches for the versions of the point cloud at the multiple moments in time. In some embodiments these steps may make up a decomposition into patches process, such as decomposition into patches process 206 of encoder 200.

To generate the time-consistent patches, at 510, the encoder may determine motion functions that model respective motions of respective portions of the point cloud from a first version of the point cloud at a first moment in time to a second (or additional) version of the point cloud at a second (or additional moment in time). For example, motion functions may be determined to model motion of segments of the point cloud from time 1 to time 2 and from time 2 to time 3. Additionally, at 520 the encoder may determine a mapping of the points across the multiple moments in time based on applying the motion functions to a reference version of the point cloud to generate a motion compensated version of the point cloud and then comparing the motion compensated version of the point cloud to another version of the point cloud at the next moment in time. For example motion functions may be applied to the version of the point cloud at time 1 to determine a motion compensated version, compensated from time 1. This motion compensated version may then be compared to the time 2 version of the point cloud.

In some embodiments, the encoder may overlay or otherwise compare the motion compensated version of the point cloud compensated from the first moment in time (e.g. version motion compensated from time 1) to the version of the point cloud at the next moment in time (e.g. version at time 2) and identify nearest matching points between the two versions of the point cloud. For example a nearest neighbor algorithm may be used to identify a closest point in the version at time 2 that most closely matches a motion compensated point from the version at time 1. Based on the closeness of these points, the nearest neighbor algorithm may determine that the motion compensated point from time 1 is actually the same point as the identified nearest neighboring point in the version at time 2. This nearest neighboring point matching process may be used to determine respective point mappings across the moments in time. A similar process may be applied for subsequent versions of the point cloud at subsequent moments in time. For example, a similar process may be used to map points from the version at time 2 to the version at time 3, and so forth. In some embodiments, a one-way mapping as described above may be applied (e.g. points may be mapped from time 1 to time 2 and from time 2 to time 3). In some embodiments, a two-way mapping may be applied. For example point may be mapped between times 1 and 2 such that the points are mapped from time 1 to time 2 and also mapped from time 2 to time 1. A similar two way mapping may be performed between times 2 and 3, in some embodiments.

In some embodiments, a piece-wise motion compensation procedure may be used to determine the motion functions for the segments of the point cloud between moments in time. For example the person shown in set 562 may be segmented into segments and motion functions may be selected to describe the motion of each of the segments. In some embodiments a rate distortion optimization (RDO) process may be used to determine a degree of segmentation to be applied to the point cloud. For example, the RDO process may weigh computational and encoding costs associated with further segmentation of the point cloud against improvements in distortion to determine a degree to which the point cloud is to be segmented.

Additionally, different motion transform functions may be applied to different segments of the point cloud to model motion of the respective segments. For example, in some embodiments, some segments of a point cloud may move in a way that is best modeled using a rigid motion model (e.g. translation and/or rotation), while other portions of the point cloud may be best modeled using an affine motion transform or an elastic motion transform.

In some embodiments, a rigid-motion transform may model a portion of a point cloud that translates or rotates but maintains its shape while moving. In some embodiments, an affine motion transform may model a portion of a point cloud that contracts, expands, dilates, rotates, shears, translates, or some combination thereof, or undergoes a similar affine motion. For example, a person's leg when walking may be modelled using an affine motion transform to capture contractions and expansions of muscles along with translation and rotation of the person's feet, shins, thighs, etc. An affine motion transform may model motion between affine spaces that preserves points, straight lines, and planes, wherein sets of parallel lines remain parallel after applying the affine motion transform. An affine motion transform may not necessarily preserve angles between lines or distances between points (as would be the case for rigid motion), but may otherwise preserve ratios of distances between points lying on a straight line. In some embodiments, an elastic motion transform may model motion of a portion of a point cloud that deforms within certain continuity constraints. For example a person wearing a dress may cause the shape of the dress to deform when the person walks within certain continuity constraints such as a stretchiness of the fabric, how the fabric folds over on itself, etc.

In some embodiments, a three dimensional (3D) segmentation method may be used to determine the portions of the point cloud for which motion models are to be selected, such as an octree segmentation process. In some embodiments, various motion functions may be selected from a set of supported motion functions to best model motion of a given segment of the point cloud. For example, the motion of some segments may be modelled using a rigid-motion transform function that considers translation and rotation of the segment of the point cloud between versions at different moments in time. While other segments may be modelled using more complex motion functions, such as an affine-motion transform or an elastic-motion transform. In some embodiments, motion functions for multiple segments of a point cloud may be determined at the same time, e.g. in parallel.

For example, in set 562 the person is moving his left arm, such that it bends at the elbow. In such a situation, an encoder may determine that the arm needs to be segmented into a forearm segment and an elbow segment, because a larger segment encompassing both the elbow and forearm would not have a consistent size or shape across the multiple moments in time. Also, the forearm may flex and best be modeled by an affine motion transform, whereas the motion of the elbow may best be modeled by a rigid-motion transform. In some embodiments, an encoder may iteratively test motion transforms to select a motion transform to use to model motion of a segment of a point cloud. For example, the encoder may first model the motion using a rigid-motion transform and compute a level of distortion. If the distortion is greater than a threshold, the encoder may then model the motion using a more complex motion transform, such as an affine motion transform or an elastic motion transform. If the distortion improves by more than a threshold amount, the encoder may select to model the motion of the segment via the more complex motion transform. In some embodiments, various other motion transforms may be used.

As discussed above, at 520, the encoder may utilize a nearest neighbor search or other suitable algorithm to match motion compensated points of a point cloud from one moment in time to points of the point cloud at another moment in time. In some embodiments, the nearest neighbor matching algorithm may utilize spatial information to map matching points. For example, the algorithm may identify points in the motion compensated version from a previous moment in time that have the shortest Euclidian distances to matching respective points in the next moment in time version of the point cloud. In some embodiments, the nearest neighbor matching algorithm may further take into account attributes of the points in determining matching points between the motion compensated version and the next moment in time version. For example, the matching algorithm may identify matching points between the motion compensated version and the next moment in time version that share the same or closely correlated attribute values, such as the same or similar colors. In some embodiments, a point matching algorithm may take into account both spatial similarities between the motion compensated points and the next moment in time points and also take into account attribute values similarities, such as the same or similar colors. Additionally, in some embodiments, neighborhood characteristics of a group of points in both the motion compensated version and the next moment in time version may be taken into account. For example if a change in illumination changes attribute values of a set of neighboring points in a similar way, this correlated change in attribute values could be accounted for when determining matching points between a motion compensated version and next moment in time version.

In some embodiments, motion estimation/modelling and point mapping which are used to determine time-consistent patches may be performed using a reduced resolution version of the point cloud. This may reduce a number points to be matched and therefore reduce computational complexity.

At 530, a normal based segmentation process may be performed in a similar manner as described above in regard to FIG. 3A and element 302 of FIG. 3A. However, instead of constraining a set of points to be included in a patch based on normal vectors of a single version of the point cloud, the same or similar constraints may be applied to the points across the multiple versions of the point cloud at the multiple moments in time, wherein the mappings determined at 520 are used to correlate matching points across the various versions. For example, in a time-consistent patch segmentation process in order to qualify to be included in a given patch, a point may be required to have a normal vector that does not deviate from normal vectors of a set of other points to be included in the patch by more than a threshold amount at time 1, time 2, and time 3. Because the points must now satisfy additional constraints (e.g. constraints at more than one moment in time), most likely the patches will be smaller because fewer points will satisfy the constraints at all the moments in time of the sequence. This can be seen by comparing the patches shown in FIG. 3B and FIG. 6, wherein in FIG. 6 the patch from FIG. 3B associated with the person's left arm is replaced with two different time-consistent patches 601 and 603, where one represents the elbow and the other the forearm.

Set 564 shown in FIG. 5 shows an initial segmentation of the point cloud taking into account multiple moments in time. At 550, an iterative segmentation refinement procedure may be applied similar to 304 described in regard to FIG. 3A. However, the refinement procedure may take into account the multiple versions of the point cloud at the multiple moments in time (e.g. time 1, time 2, and time 3) to generate a sequence 566 of point cloud versions with refined segments.

At 560, a final segmentation may be performed to generate time-consistent patches for point cloud versions of sequence 568. For example a similar process as described above at 306 of FIG. 3A may be applied. Also, a similar packing process as described above may be applied to pack the final patches into respective image frames for the different moments in time. Except for in regard to time-consistent patches, the final patches for each of the versions of the point cloud at the different moments in time of the sequence may be packed into different respective image frames for the sequence at the same or similar locations in the respective image frames. Also, as discussed above, the points included in the time-consistent patches may have different attribute values in the different image frames that correspond to different versions of the point cloud at different moments in time, even though the patch sizes, shapes, and locations are time-consistent across the different image frames.

FIG. 6 illustrates an example sequence of image frames comprising time-consistent patches, according to some embodiments.

As discussed above, the patches of the image frames of sequence 600 may be consistent in size, shape and location even though the attribute values of the points included in the patches may change (or depth values for geometry patches). Also, in some embodiments, a single occupancy map may be generated and signaled for the sequence. For example, a single occupancy map may correspond to multiple image frames of a sequence of image frames having time-consistent patches. For example a single occupancy map may be signaled for the image frames included in sequence 600. In some embodiments, the occupancy map and frame sequence relationship (e.g. which image frames correspond to which occupancy map) may be signaled in a sequence header, such as may be included in a PCCNAL unit as described in more detail below in regard to FIG. 11.

Figure 7:
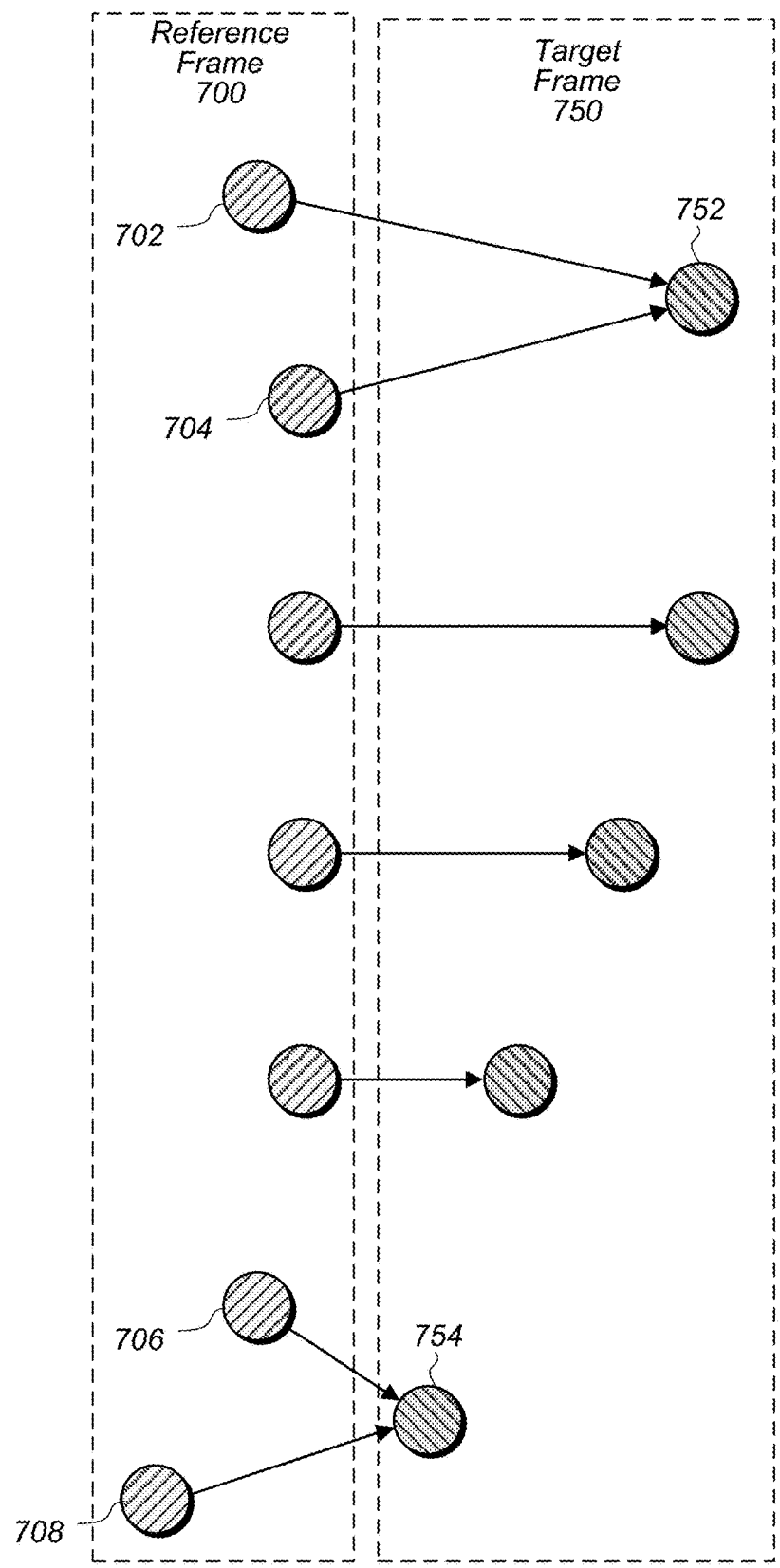
FIG. 7 illustrates an example of versions of a point cloud at different moments in time that have different numbers of points and mappings between the points at the different moments in time, according to some embodiments.

FIG. 7 illustrates an example of versions of a point cloud at different moments in time that have different numbers of points and mappings between the points at the different moments in time, according to some embodiments.

In some embodiments, a version of a point cloud at a first moment in time may include more or fewer points than another version of the point cloud at another moment in time. For example, reference frame 700 shown in FIG. 7 includes more points than target frame 750. In such a circumstance, a point mapping process may map more than one point in a particular version of a point cloud to a single point in a subsequent or preceding version of the point cloud. For example, points 702 and 704 are both mapped to point 752. Also both points 706 and 708 are mapped to point 754. In some embodiments, alternatively or additionally, an encoder may re-sample one or more versions of the point cloud such that the different versions have the same number of points or less of a difference in point count.

Figure 8:
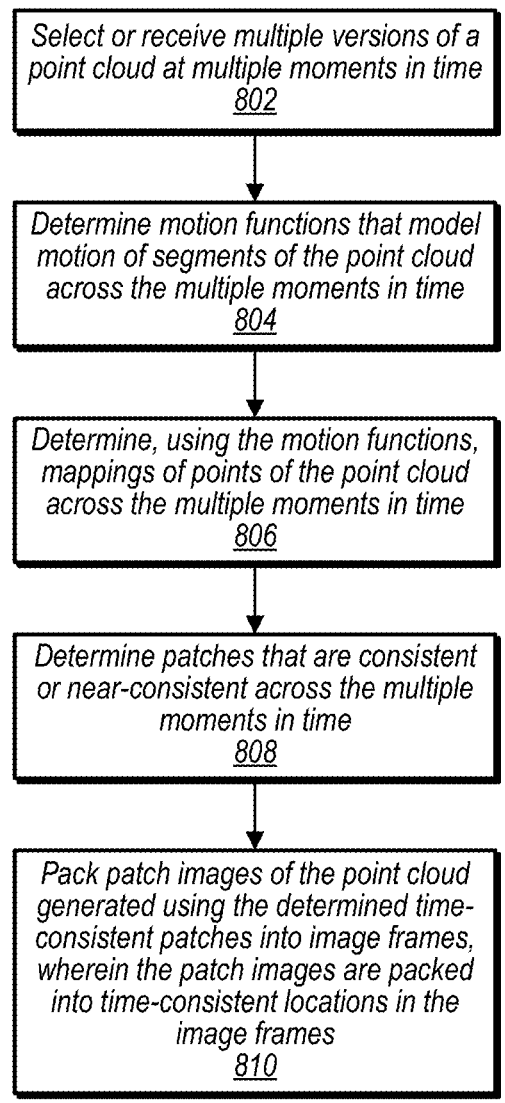
FIG. 8 illustrates a process for determining time-consistent patches, according to some embodiments.

FIG. 8 illustrates a process for determining time-consistent patches, according to some embodiments.

At 802, an encoder or a decomposition into patches module of an encoder, receives or selects a sequence of versions of a point cloud at different moments in time for which time-consistent patches are to be generated.

At 804, motion functions are determined that model motion of segments of the point cloud across the multiple moments in time. For example, the point cloud may be segmented into octants of an octree and a motion function may be determined for each lowest level octant. In some embodiments various motion transforms/functions may be used to model the motions of the octants, such as a rigid-motion transform, an affine motion transform, an elastic motion transform, etc. In some embodiments, a rate distortion optimization or similar process may be used to select a degree to which to segment the point cloud, e.g. whether or not to segment the lowest level octants into even smaller octants. Also a rate distortion optimization may be used to select motion transform functions to be applied to the lowest level octants. In some embodiments, a single RDO (rate distortion optimization) process may take into account both segment size and segment motion transform function selections.

At 806, the determined motion functions/motion transforms may be used to determine mappings between points of the point cloud included in the different versions of the point cloud at the different moments in time. For example, a nearest neighbor matching process as described above may be used.

At 808, time-consistent patches are determined applying segmentation constraints to the mapped points across the multiple moments in time.

At 810, the time-consistent patches are packed into a set of image frames of a sequence, wherein the time-consistent patches are packed into time-consistent locations in the set of image frames of the sequence.

Figure 9:
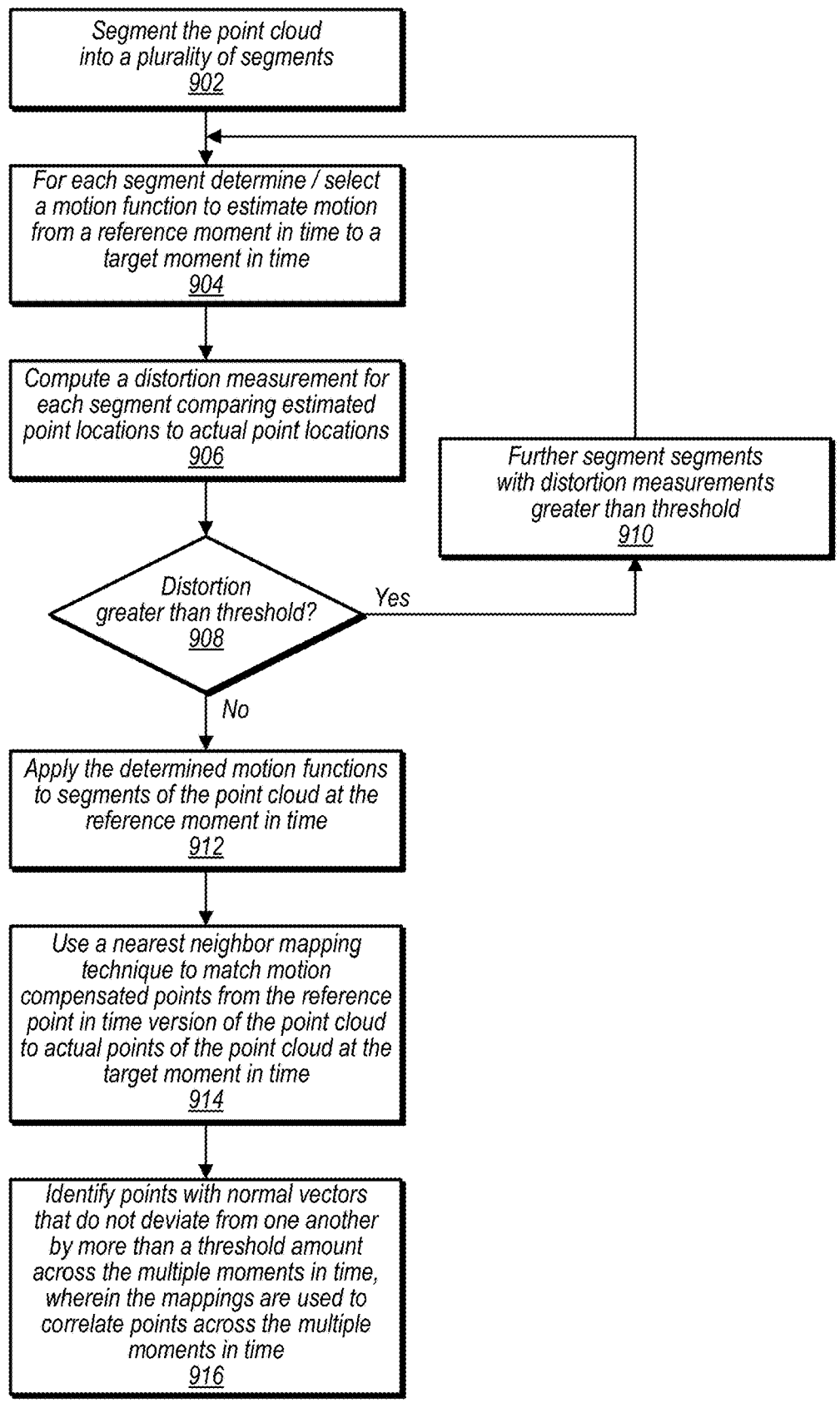
FIG. 9 illustrates a process for determining a segment size for motion estimation, according to some embodiments.

FIG. 9 illustrates a process for determining a segment size for motion estimation, according to some embodiments.

At 902, a point cloud for which time consistent-patches is to be determined is segmented into a plurality of segments. For example the point cloud may be segmented into a first level of octants of an octree.

At 904, a motion function/motion transform is selected to model motion of each of the segments of the point cloud from a reference frame (e.g. reference moment in time) to a target frame (e.g. target moment in time).

At 906, a distortion measurement for each of the segments is computed to determine a distortion of the point cloud when the motion functions are applied to the determined segments as compared to the point cloud at the target moment in time. In some embodiments, the distortion measurement may be an overall distortion measurement for the point cloud that measures an amount of distortion introduced by comparing the motion compensated reference frame version of the point cloud to the target frame version of the point cloud. In some embodiments, distortion may be determined/computed at a segment level.

At 908, it is determined whether or not the computed distortion is greater than a distortion threshold and/or whether a rate distortion optimization analysis suggests further segmentation. If so, at 910 the segments of the point cloud for which the distortion threshold was exceeded or the RDO indicated further segmentation is warranted, are further segmented. For example an octant of the point cloud may be further segmented into eight lower level octants. Each of the further segmented segments is then processed through steps 904 and 906 until the distortion thresholds of 908 are satisfied. In some embodiments, different segments of the point cloud may be segmented into smaller segments than other segments of the point cloud. For example, the threshold or RDO process may indicate that further segmenting some segments is warranted, while for other segments further segmentation is not warranted.

At 912, determined motion functions are applied to the determined segments of the point cloud at the reference frame to generate a motion compensated version of the reference frame point cloud.

At 914, a nearest neighbor mapping technique is used to map points of the motion compensated segments of the reference frame to points in the target frame. The nearest neighbor matching technique maps points of the motion compensated version of the reference frame to nearest neighboring points in the target frame having the shortest Euclidian distances between the motion compensated points and the target frame points. Also, in some embodiments, attribute values of the points may further be considered to map points between a reference frame and a target frame.

At 916, points with normal vectors that do not deviate from one another across multiple mapped versions of the point cloud at different moments in time are grouped together to form patches. The patches may further be refined as described herein to determine a final set of patches.

Figure 10A:
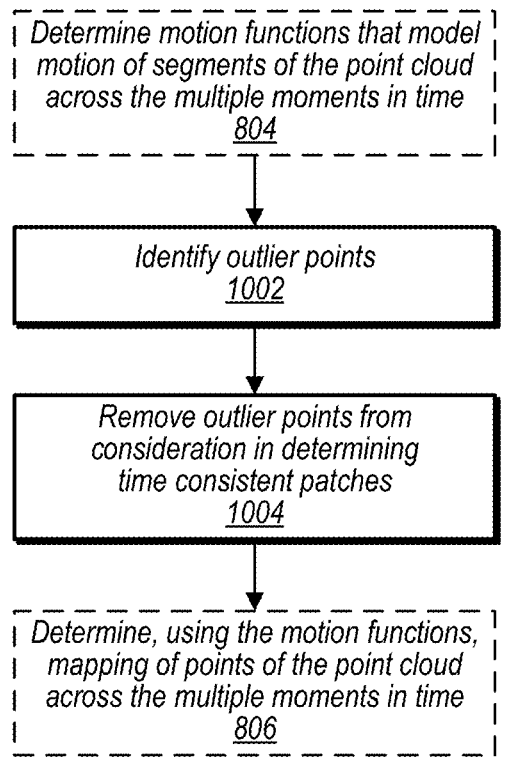
FIG. 10A illustrates steps for removing outlier points when determining time-consistent patches, according to some embodiments.

FIG. 10A illustrates steps for removing outlier points when determining time-consistent patches, according to some embodiments.

In some embodiments, outlier points that have motion across the multiple moments in time of a sequence that varies from motion of surrounding points by more than a threshold amount of variance may be removed from consideration when determining time-consistent patches. For example, in some embodiments, between steps 804 and 806, outlier points may be identified at 1002 and the identified outlier points may be removed from consideration in determining time-consistent patches at 1004.

Figure 10B:
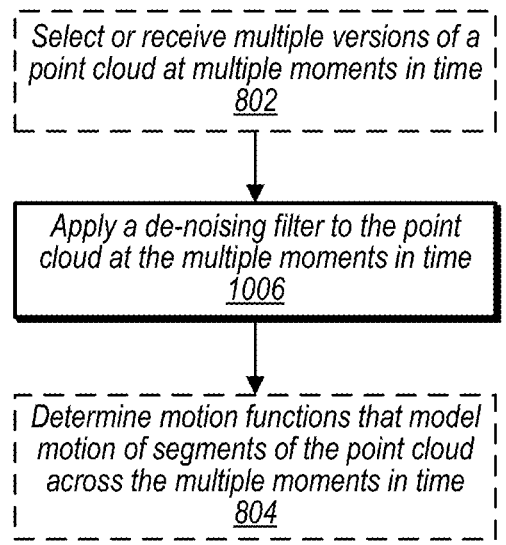
FIG. 10B illustrates a step for applying a denoising filter when determining time-consistent patches, according to some embodiments.

FIG. 10B illustrates a step for applying a denoising filter when determining time-consistent patches, according to some embodiments.

In some embodiments, a de-noising filter may be applied to the point cloud between steps 802 and 804. For example, at 1006 a de-noising filter is applied to the point cloud versions of the sequence.

Figure 10C:
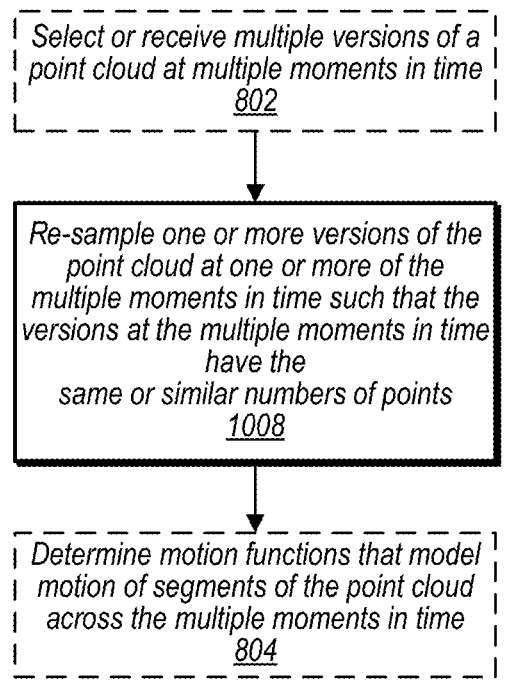
FIG. 10C illustrates a step for re-sampling one or more version of a point cloud at different moments in time when determining time-consistent patches, according to some embodiments.

FIG. 10C illustrates a step for re-sampling one or more version of a point cloud at different moments in time when determining time-consistent patches, according to some embodiments.

In some embodiments, a re-sampling of the points may be applied to the point cloud between steps 802 and 804. For example, at 1008 one or more versions of the point cloud of a plurality of versions included in a sequence are resampled. The re-sampling may result in the different versions of the point cloud in sequence having a same quantity of points or having more closely even quantities of points.

Padding

In some embodiments, padding may be performed to fill the non-occupied pixels with values such that the resulting image is suited for video/image compression. For example, image frame padding module 216 or image padding module 262 may perform padding as described below.

In some embodiments, padding is applied on pixels blocks, while favoring the intra-prediction modes used by existing video codecs. More precisely, for each block of size B×B to be padded, the intra prediction modes available at the video encoder side are assessed and the one that produces the lowest prediction errors on the occupied pixels is retained. This may take advantage of the fact that video/image codecs commonly operate on pixel blocks with pre-defined sizes (e.g., 64×64, 32×32, 16×16 . . . ). In some embodiments, other padding techniques may include linear extrapolation, in-painting techniques, or other suitable techniques.

Video Compression

In some embodiments, a video compression module, such as video compression module 218 or video compression module 264, may perform video compression as described below.

In some embodiments, a video encoder may leverage an occupancy map, which describes for each pixel of an image whether it stores information belonging to the point cloud or padded pixels. In some embodiments, such information may permit enabling various features adaptively, such as de-blocking, adaptive loop filtering (ALF), or shape adaptive offset (SAO) filtering. Also, such information may allow a rate control module to adapt and assign different, e.g. lower, quantization parameters (QPs), and in an essence a different amount of bits, to the blocks containing the occupancy map edges. Coding parameters, such as lagrangian multipliers, quantization thresholding, quantization matrices, etc. may also be adjusted according to the characteristics of the point cloud projected blocks. In some embodiments, such information may also enable rate distortion optimization (RDO) and rate control/allocation to leverage the occupancy map to consider distortions based on non-padded pixels. In a more general form, weighting of distortion may be based on the "importance" of each pixel to the point cloud geometry. Importance may be based on a variety of aspects, e.g. on proximity to other point cloud samples, directionality/orientation/position of the samples, etc. Facing forward samples, for example, may receive a higher weighting in the distortion computation than backward facing samples. Distortion may be computed using metrics such as Mean Square or Absolute Error, but different distortion metrics may also be considered, such as SSIM, VQM, VDP, Hausdorff distance, and others.

Also, in some embodiments, such encoders and decoders or other encoders and decoders as described herein may be adapted for other visual volumetric content, including meshes, three-degree of freedom plus (3DOF+) scenes or as alternatively referred to in some contexts as MPEG MIV material, lightfields, or other types of six-degree of freedom (6DOF) content.

Example Bit Stream Structure for Compressed Point Cloud Data

Figure 11:
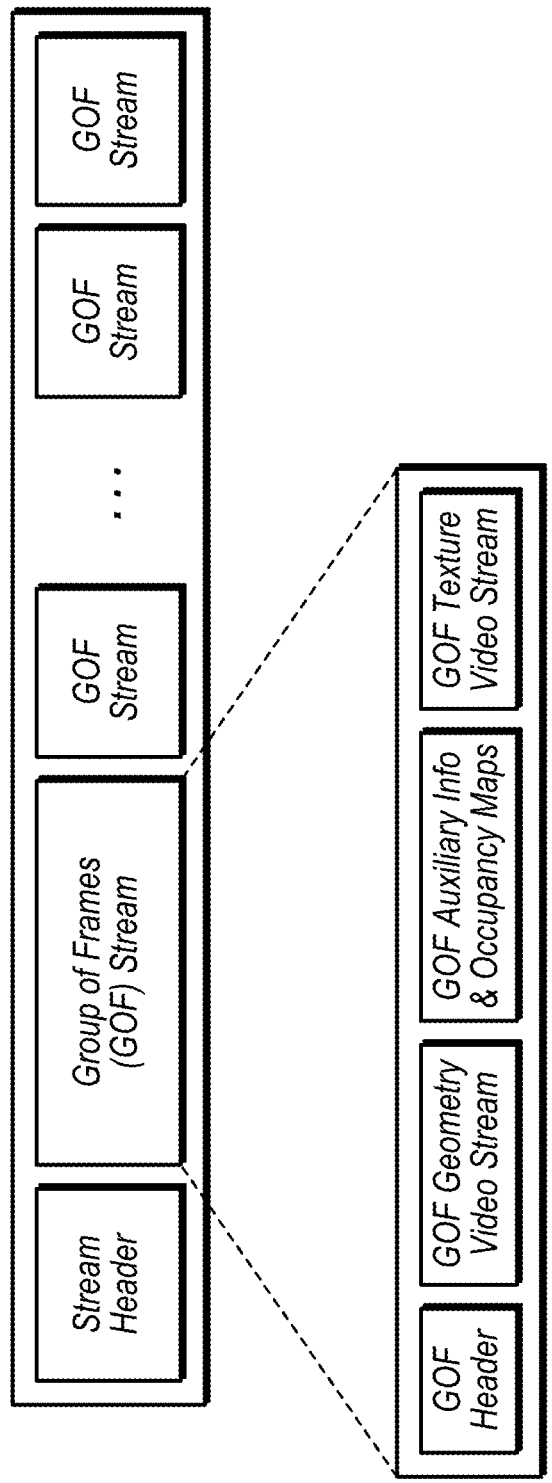
FIG. 11 illustrates, a bit stream structure for a compressed point cloud, according to some embodiments.

In some embodiments, relationship information for patch images in an image frame may be included in or derived from a bit stream for a compressed point cloud. For example, FIG. 11 illustrates a bit stream structure for a compressed point cloud, according to some embodiments. In some embodiments a bit stream structure may include a stream header and multiple group of frames streams. In some embodiments, each group of frames stream may include a header for the group of frames along with geometry image frames, texture/attribute image frames, and auxiliary information/occupancy maps for the group of frames. In some embodiments, time-consistent patches may be used, such that an occupancy map applies to multiple geometry/attribute/texture image frames that describe the point cloud at multiple moments in time (e.g. 3D point cloud frames). In some embodiments, a header for a group of frames and/or a header for a stream may indicate which occupancy map applies to which set of 3D point cloud frames represented by geometry and attribute/texture 2D image frames.

In some embodiments, the auxiliary information may include relationship information for patch images. Also, in some embodiments an occupancy map may include relationship information for patches of an image frame. For example, an occupancy map may indicate which portions of an image frame are occupied or unoccupied. Also, the auxiliary information may indicate which blocks of an image frame correspond to which patches. This information may be used to determine portions of an image frame that correspond to a same patch. Also depth information included in the geometry information (e.g. depth patch images) may be used to identify portions of image frames for points having a common depth in the point cloud. Additionally, attribute/texture information included in the texture video stream may be used to identify patches in the image frames with similar textures or attribute values.

Example Methods of Compressing and Decompressing Point Clouds

Figure 12A:
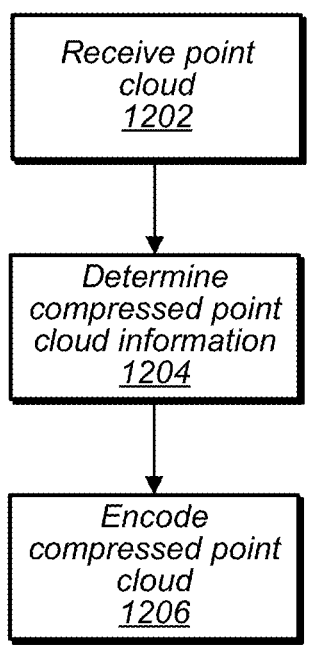
FIG. 12A illustrates a process for compressing attribute and spatial information of a point cloud, according to some embodiments.

FIG. 12A illustrates a process for compressing attribute and spatial information of a point cloud, according to some embodiments.

At 1202, a point cloud is received by an encoder. The point cloud may be captured, for example by one or more sensors, or may be generated, for example in software.

At 1204, compressed point cloud information is determined, using any of the techniques described herein or using one more combinations of the techniques described herein.

At 1206, a compressed point cloud is encoded using the compressed point cloud information determined at 1204. The point cloud may be compressed using any of the techniques described herein.

Figure 12B:
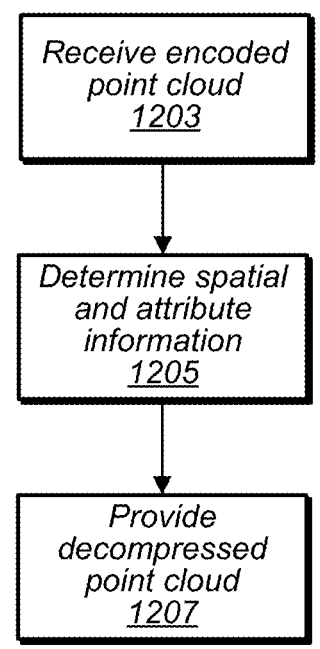
FIG. 12B illustrates a process for decompressing attribute and spatial information of a point cloud, according to some embodiments.

FIG. 12B illustrates a process for decompressing attribute and spatial information of a point cloud, according to some embodiments.

At 1203 an encoded point cloud is received. The point cloud may have been encoded using any of the encoding techniques described herein, such as patch images packed into an image frame that is then encoded by a video encoder. In some embodiments, the encoded point cloud may comprise point cloud projections, such as projections onto a cube, cylinder, sphere, etc. that are then encoded via a video encoder.

At 1205, spatial and attribute information for the encoded point cloud is determined. For example, a video decoder may be used to decode video encoded packed images or projects. Spatial information may then be determined based on the packed images or projections and combined to determine spatial information for points of the point cloud. For example, depth information for points of a patch may be matched with X and Y information for the points of the patch to determine spatial information for the points of the patch in 3D space. In a similar manner other attributes, included in patch images such as color attributes, texture attributes, etc. may be matched with corresponding points to determine attribute values for the points. Also, in the case of multiple projections, the same point may be identified in more than one of the projections to determine spatial information for the point in 3D space.

At 1207, a decompressed point cloud may be provided to a recipient device or module.

Figure 12C:
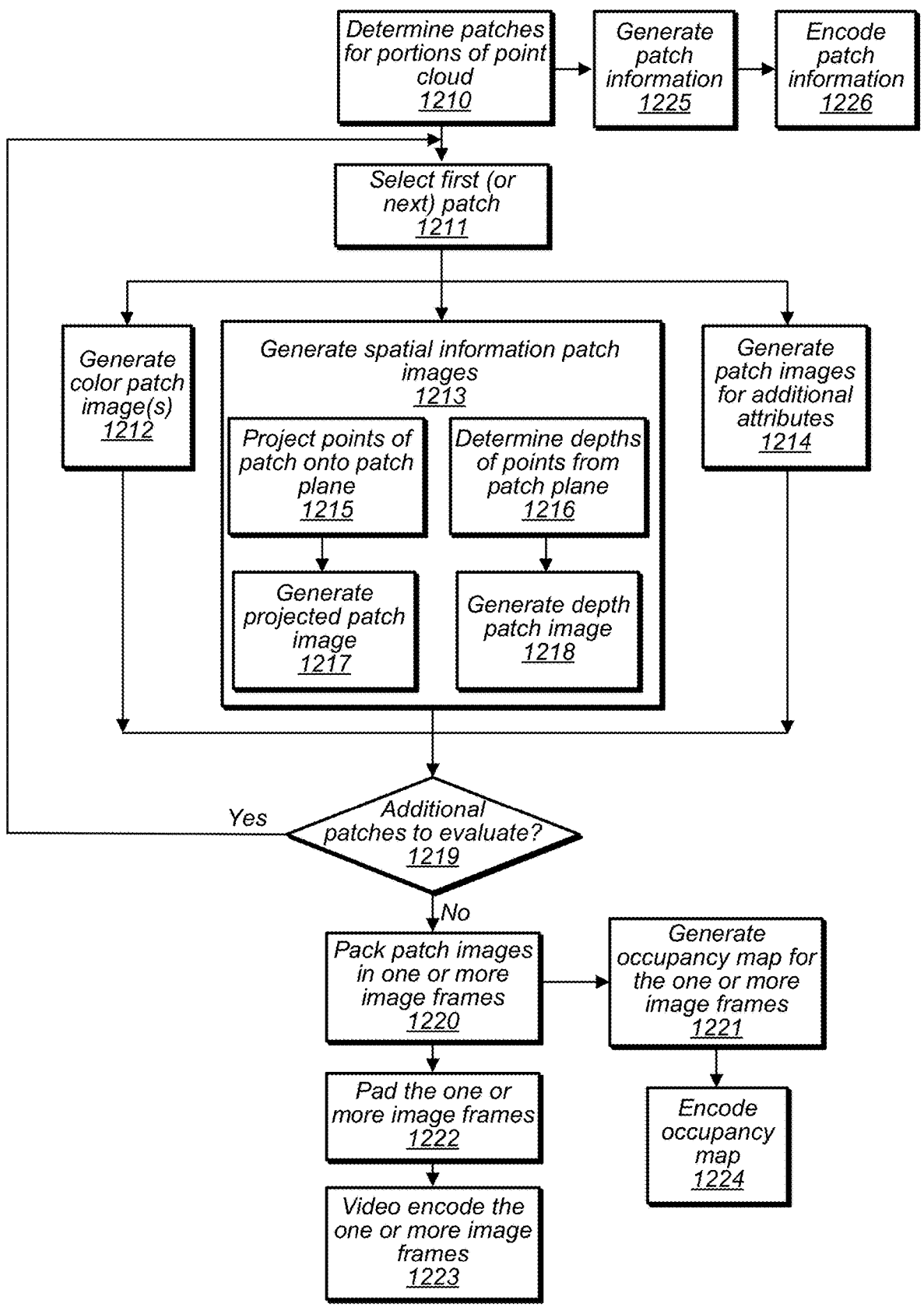
FIG. 12C illustrates patch images being generated and packed into an image frame to compress attribute and spatial information of a point cloud, according to some embodiments.

FIG. 12C illustrates patch images being generated and packed into an image frame to compress attribute and spatial information of a point cloud, according to some embodiments.

At 1210, patches are determined for portions of point cloud. For example patches may be determined as described above. At 1225 patch information for the patches may be generated and at 1226, may be encoded to be sent to a decoder. In some embodiments, encoded patch information may be separately encoded from one or more image frames comprising packed patch images.

At 1211, a first patch (or next patch is selected). At 1212 a color (e.g. attribute) patch image is generated for the points of the point cloud included in the patch. At 1214, one or more additional attribute images, such as a texture attribute image, are generated for the points of the point cloud included in the patch.

At 1213, spatial information images are generated for the points of the point cloud included in the patch. In some embodiments, to generate the spatial information images, the points of the point cloud are projected, at 1215, onto a patch plane perpendicular to a normal vector normal to a surface of the point cloud at the patch location. At 1217 a first spatial image is generated for the patch based on the points being projected on the patch plane at 1215. In addition, depth information for the points of the patch relative to the patch plane is determined at 1216, and at 1218 a depth patch image is generated based on the depth information determined at 1216.

At 1219, it is determined whether there are additional patches for which patch images are to be generated. If so, the process reverts to 1211 for the next patch. If not, at 1220 the patch images for the patches are packed into one or more image frames. In some embodiments, patch images for respective patches may be packed before patch images are determined for other patches. At 1221, an occupancy map is generated based on where the patch images were placed when being packed into the one or more image frames. At 1224, the occupancy map is encoded. As discussed above, in some embodiments, the occupancy map may be encoded using an arithmetic encoder, entropy encoder etc. Also, in some embodiments, the occupancy map may be encoded using a video encoder, wherein the occupancy map is organized as an additional image frame that corresponds with a patch image frame and that represents portions of the patch image frame that are occupied with patch images (e.g. occupied pixels) and portions of the patch image frame that are padded (e.g. non-occupied pixels).

At 1222, spaces in the one or more image frames that are not occupied by patch images are padded. In some embodiments, an occupancy map for a patch image frame may be generated before or after the patch image frame is padded at 1222.

At 1223, the one or more image frames are video encoded, such as in accordance with a high efficiency video coding (HEVC) standard. In some embodiments, in which an occupancy map is represented by an occupancy map video image frame, the occupancy map video image frame may be video encoded at 1223.

Figure 12D:
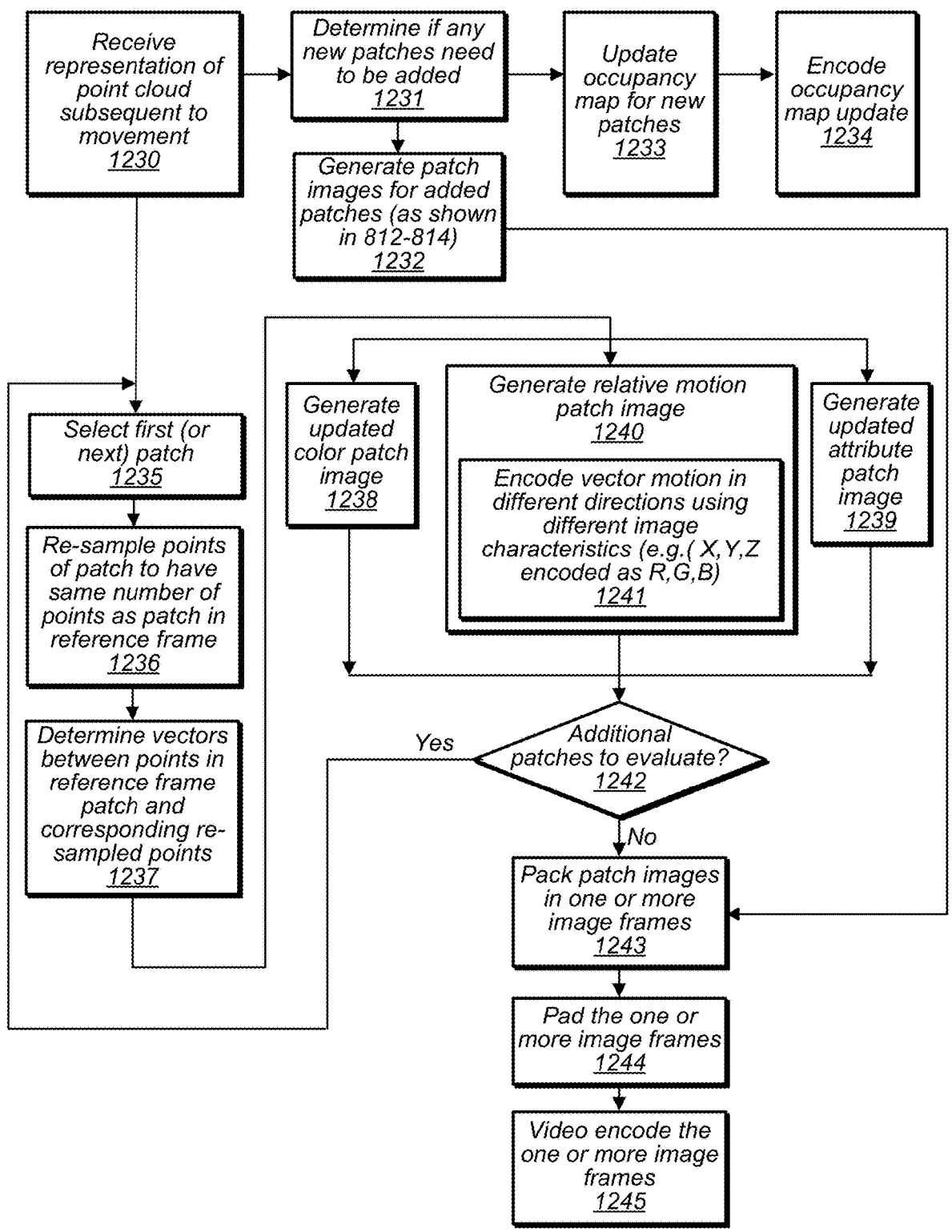
FIG. 12D illustrates patch images being generated and packed into an image frame to compress attribute and spatial information of a moving or changing point cloud, according to some embodiments.

FIG. 12D illustrates patch images being generated and packed into an image frame to compress attribute and spatial information of a moving or changing point cloud, according to some embodiments.

At 1230, point cloud information for a previously encoded point cloud is received wherein the point cloud information represents a subsequent version of the previously encoded point cloud. For example, the subsequent version may be a representation of the point cloud at a subsequent moment in time, wherein the point cloud is moving or changing as time progresses.

At 1231, it is determined if any new patches need to be determined for the point cloud. For example, an object not currently in the previously encoded point cloud may have been added to the point cloud. For example, the point cloud may be a point cloud of a road and a ball may have entered into the road. If there is a need to add a new patch, the occupancy map is updated at 1233 to include the new patch and encoded at 1234. Also, at 1232 patch images are generated for the new patch in similar manner as described in 1212-1214. The generated patch images are included in packing at 1243.

At 1235, a first or next patch of the patches generated for the reference (previous) point cloud is selected. At 1236, the points of the patch are re-sampled as described herein. At 1237 motion vectors for the points included in the selected patch between the reference point cloud and the current point cloud are determined. At 1240 the motion vectors are used to generate a relative motion patch image. For example, in some embodiments, generating a relative motion patch image may comprise, encoding, at 1241, vector motion in different directions using different image characteristics, as described herein. At 1238 an updated color patch image is generated. In some embodiments, the updated color patch image may encode residual values indicating differences in colors of the points of the point cloud included in the patch between the reference point cloud and the current point cloud. In a similar manner, at 1239, other attribute update patch images may be generated.

At 1242, it is determined whether there are additional patches to be evaluated. If so, the process reverts to 1235 for the next patch. If not, at 1243 the patch images for the patches are packed into one or more image frames. In some embodiments, patch images for respective patches may be packed before patch images are determined for other patches.

At 1244, spaces in the one or more image frames that are not occupied by patch images are padded.

At 1245, the one or more image frames are video encoded, such as in accordance with a high efficiency video coding (HEVC) standard.

Figure 12E:
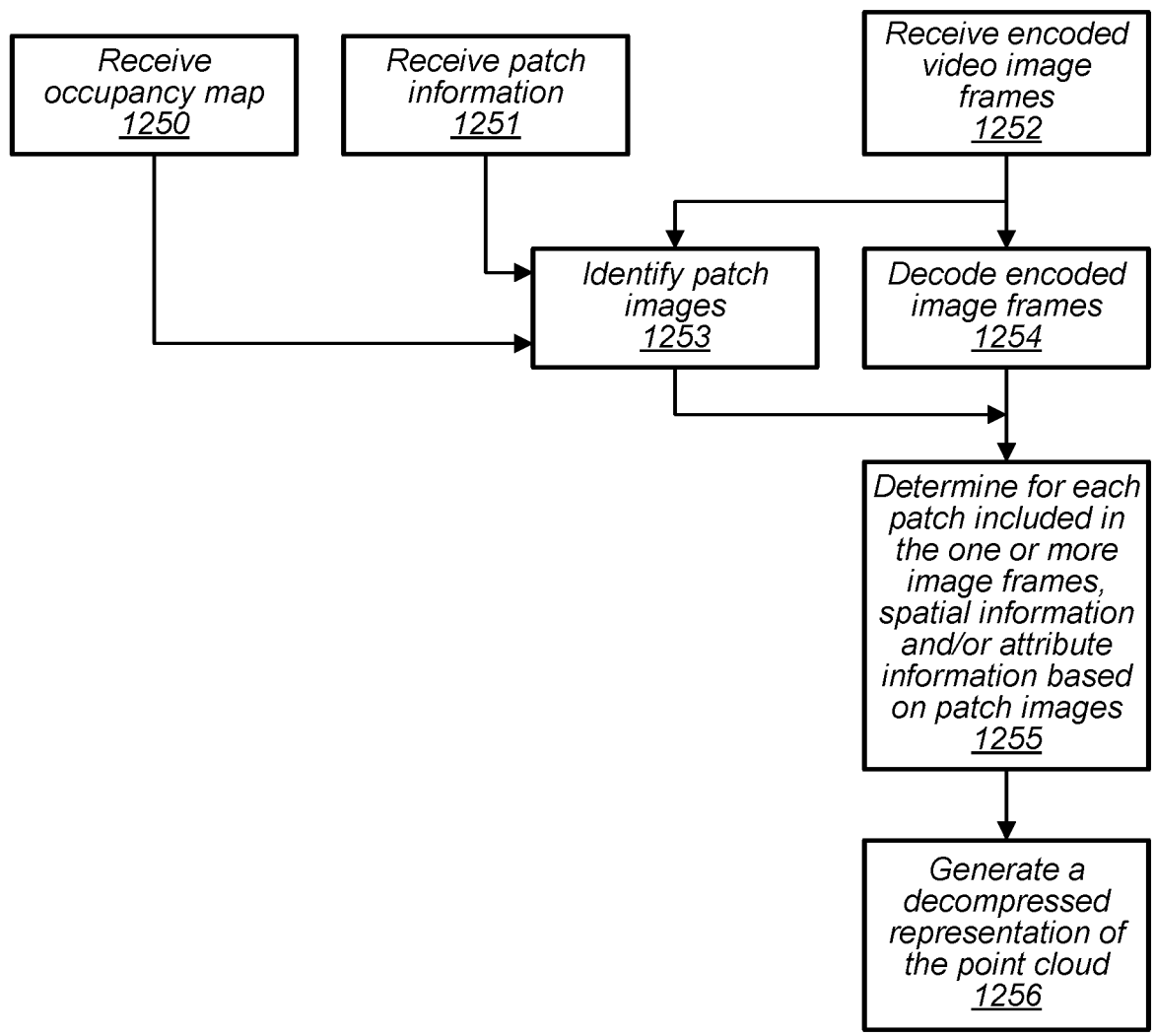
FIG. 12E illustrates a decoder receiving image frames comprising patch images, patch information, and an occupancy map, and generating a decompressed representation of a point cloud, according to some embodiments.

FIG. 12E illustrates a decoder receiving image frames comprising patch images, patch information, and an occupancy map, and generating a decompressed representation of a point cloud, according to some embodiments.

At 1250, an occupancy map is received by a decoder, at 1251 patch information is received by the decoder. In some embodiments the occupancy map and the patch information may be encoded and the decoder may decode the occupancy map and the patch information (not shown). At 1252, the decoder receives one or more encoded video image frames. At 1252 the decoder identifies patch images in the one or more encoded video image frames and at 1254 the decoder decodes the encoded video image frames. In some embodiments, the decoder may utilize the occupancy map and the patch information to identify active and non-active portions of the one or more encoded video images and may adjust one or more decoded parameters used to decode the encoded video images based on whether portions, e.g. blocks, sub-blocks, pixels, etc. comprise active or non-active information.

At 1255, the decoder determines spatial information and/or attribute information for the points of the respective patches and at 1256 generates a decompressed representation of the point cloud encoded in the one or more encoded video images.

Example Applications Using Point Cloud Encoders and Decoders

Figure 13:
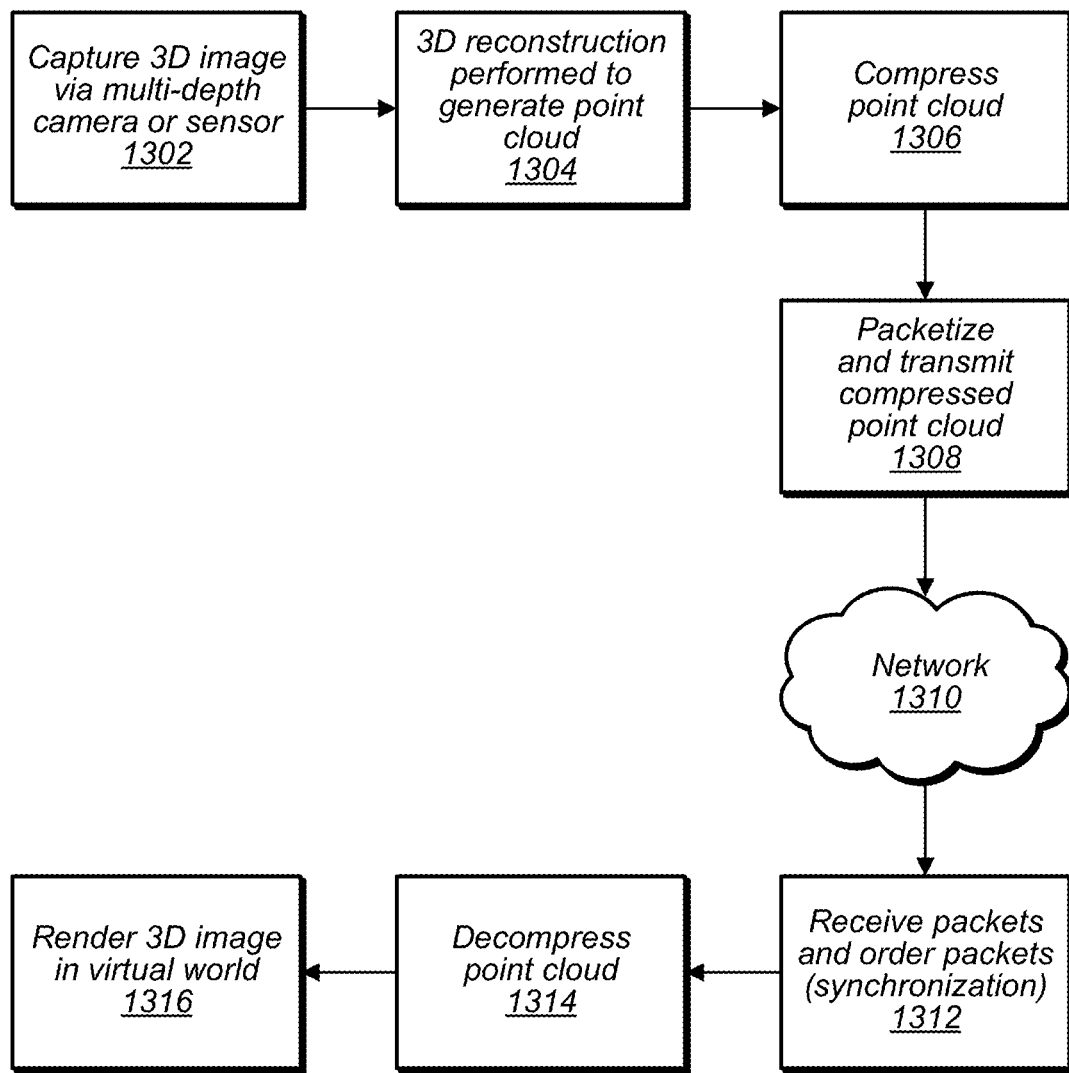
FIG. 13 illustrates compressed point cloud information being used in a 3-D application, according to some embodiments.

FIG. 13 illustrates compressed point clouds being used in a 3-D application, according to some embodiments.

In some embodiments, a sensor, such as sensor 102, an encoder, such as encoder 104 or any of the other encoders described herein, and a decoder, such as decoder 116 or any of the decoders described herein, may be used to communicate point clouds in a 3-D application. For example, a sensor, such as sensor 102, at 1302 may capture a 3D image and at 1304, the sensor or a processor associated with the sensor may perform a 3D reconstruction based on sensed data to generate a point cloud.

At 1306, an encoder such as encoder 104 may compress the point cloud and at 1308 the encoder or a post processor may packetize and transmit the compressed point cloud, via a network 1310. At 1312, the packets may be received at a destination location that includes a decoder, such as decoder 116. The decoder may decompress the point cloud at 1314 and the decompressed point cloud may be rendered at 1316. In some embodiments a 3-D application may transmit point cloud data in real time such that a display at 1316 represents images being observed at 1302. For example, a camera in a canyon may allow a remote user to experience walking through a virtual canyon at 1316.

Figure 14:
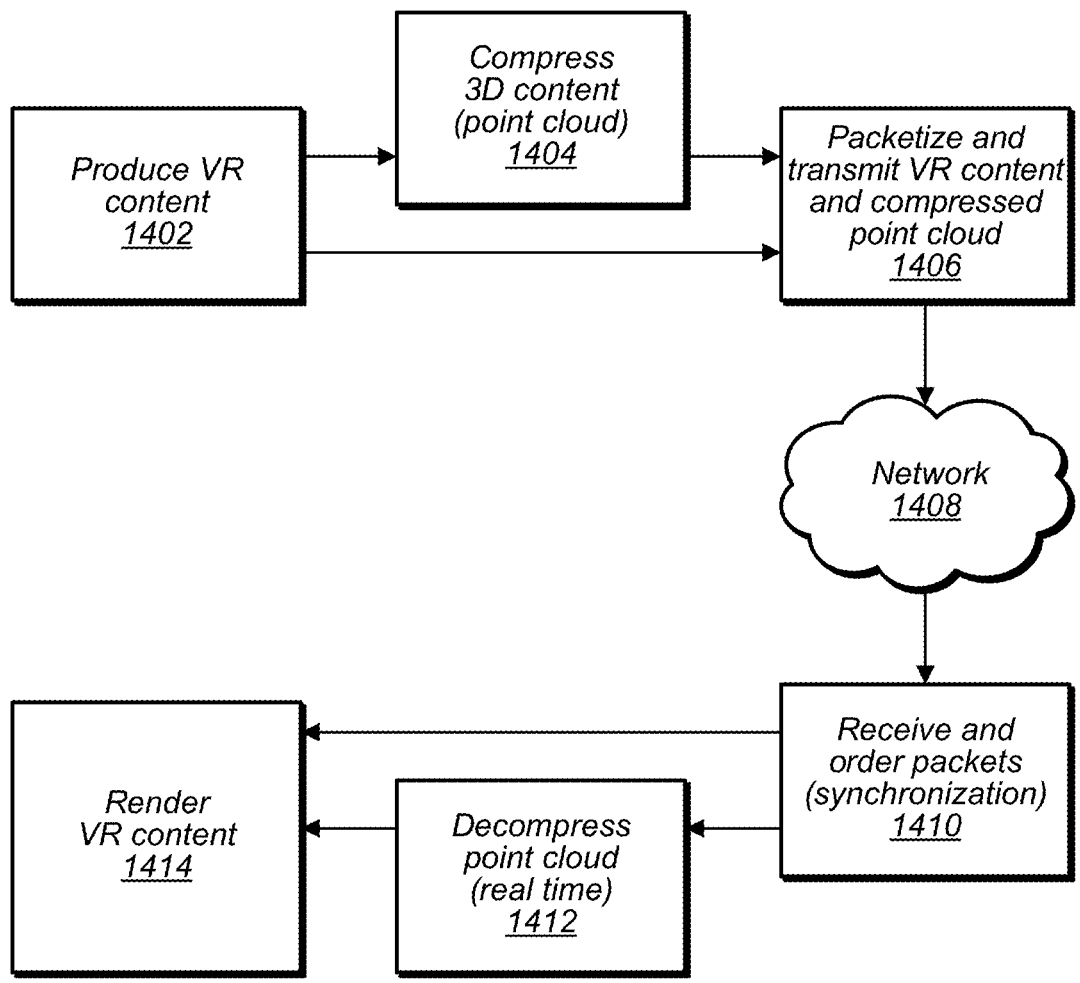
FIG. 14 illustrates compressed point cloud information being used in a virtual reality application, according to some embodiments.

FIG. 14 illustrates compressed point clouds being used in a virtual reality (VR) or augmented reality (AR) application, according to some embodiments.

In some embodiments, point clouds may be generated in software (for example as opposed to being captured by a sensor). For example, at 1402 virtual reality or augmented reality content is produced. The virtual reality or augmented reality content may include point cloud data and non-point cloud data. For example, a non-point cloud character may traverse a landscape represented by point clouds, as one example. At 1404, the point cloud data may be compressed and at 1406 the compressed point cloud data and non-point cloud data may be packetized and transmitted via a network 1408. For example, the virtual reality or augmented reality content produced at 1402 may be produced at a remote server and communicated to a VR or AR content consumer via network 1408. At 1410, the packets may be received and synchronized at the VR or AR consumer's device. A decoder operating at the VR or AR consumer's device may decompress the compressed point cloud at 1412 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 15:
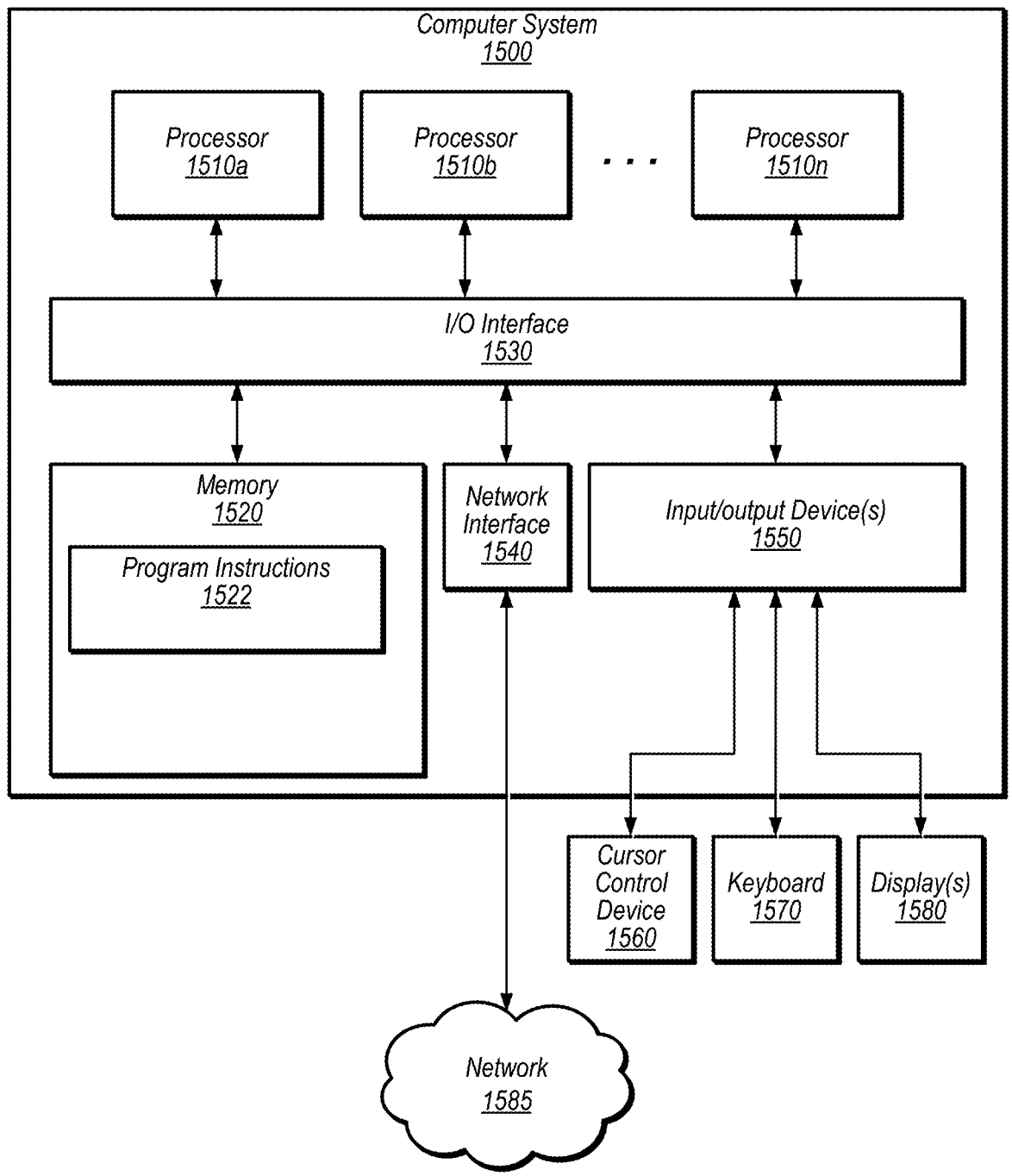
FIG. 15 illustrates an example computer system that may implement an encoder or decoder, according to some embodiments.

FIG. 15 illustrates an example computer system 1500 that may implement an encoder or decoder or any other ones of the components described herein, (e.g., any of the components described above with reference to FIGS. 1-14), in accordance with some embodiments. The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1500, which may interact with various other devices. Note that any component, action, or functionality described above with respect to FIGS. 1-14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store point cloud compression or point cloud decompression program instructions 1522 and/or sensor data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement an image sensor control application incorporating any of the functionality described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed by one or more processors, cause the one or more processors to:

determine, for a set of visual volumetric content comprising a point cloud, a plurality of patches, wherein each patch comprises points of the point cloud projected on a patch plane, wherein to determine the plurality of patches the program instructions cause the one or more processors to:
  determine one or more motion functions that model motion of one or more segments of the point cloud across multiple moments in time;
  determine, based on the one or more motion functions, mappings between points of the point cloud across the multiple moments in time; and
  determine one or more patches comprising points of the point cloud that have surface normal vectors that deviate from one another at each of the multiple moments in time by less than a threshold amount; and
pack patch images for the determined one or more patches into a plurality of image frames, wherein the plurality of image frames comprise consistent patches for the point cloud across the multiple moments in time.

2. The non-transitory computer-readable medium of claim 1, wherein the program instructions cause the one or more processors to:
pack the patch images in consistent locations in the plurality of image frames for the multiple moments in time.

3. The non-transitory computer-readable medium of claim 1, wherein to determine the mappings between points of the point cloud across the multiple moments in time, the program instructions cause the one or more processors to:
  apply the determined one or more motion functions to a first set of points for a first moment in time to determine estimated locations of the points from the first moment in time at one or more other ones of the multiple moments in time; and
  for each of the one or more other moments in time, identify closest neighboring points of the point cloud at the one or more other moments in time that correspond to the estimated locations of the points of the point cloud estimated from the first moment in time.

4. The non-transitory computer-readable medium of claim 1, wherein the program instructions cause the one or more processors to determine different motion functions for different ones of the segments of the point cloud.

5. The non-transitory computer-readable medium of claim 1, wherein the one or more motion functions comprise one or more of:
  a rigid-motion transform function;
  an affine-motion transform function; or
  an elastic-motion transform function.

6. The non-transitory computer-readable medium of claim 1, wherein the one or more motion functions are determined based on spatial coordinates of the points of the point cloud across the multiple moments in time and attribute values of the points of the point cloud across the multiple moments in time.

7. The non-transitory computer-readable medium of claim 1, wherein the program instructions further cause the one or more processors to:
  apply, prior to determining the one or more motion functions, a de-noising filter to data representing the point cloud across the multiple moments in time.

8. The non-transitory computer-readable medium of claim 1, wherein the program instructions further cause the one or more processors to:
prior to determining the one or more patches:
  identify one or more outlier points of the point cloud that have motions that deviate from surrounding points across the multiple moments in time; and
  remove the one or more outlier points from point cloud data used to determine the one or more patches.

9. The non-transitory computer-readable medium of claim 1, wherein the program instructions further cause the one or more processors to:
generate an occupancy map indicating locations of the patch images in the image frames for the multiple moments in time.

10. The non-transitory computer-readable medium of claim 1, wherein the program instructions further cause the one or more processors to:
indicate in a sequence header for a sequence of image frames, an occupancy map to be applied for the image frames included in the sequence of image frames.

11. A device, comprising:
a memory storing program instructions for compressing three-dimensional (3D) point cloud data using two-dimensional (2D) image frames; and
one or more processors, wherein the program instructions, when executed by the one or more processors, cause the one or more processors to:
  determine, for a set of visual volumetric content comprising a point cloud, a plurality of patches, wherein each patch comprises points of the point cloud projected on a 2D patch plane, wherein to determine the plurality of patches the program instructions cause the one or more processors to:
    determine one or more motion functions that model motion of one or more segments of the point cloud across multiple moments in time;
    determine, based on the one or more motion functions, mappings between points of the point cloud across the multiple moments in time; and
    generate one or more patches comprising points of the point cloud that deviate from one another at each of the multiple moments in time by less than a threshold amount; and
  pack patch images for the determined one or more patches into a plurality of 2D image frames.

12. The device of claim 11, further comprising:
one or more sensors configured to capture spatial information and attribute information for the points of the point cloud.

13. The device of claim 12, wherein the patch images packed into the plurality of 2D image frames comprise:
a geometry information patch image for each patch; and
one or more attribute information patch images for each patch.

14. The device of claim 13, wherein the program instructions, when executed by the one or more processors, further cause the one or more processors to:
video encode the plurality of 2D image frames to generate a compressed video representation of the captured point cloud.

15. The device of claim 11, wherein the program instructions, when executed by the one or more processors, further cause the one or more processors to:
apply, prior to determining the one or more motion functions, a de-noising filter to data representing the point cloud across the multiple moments in time.

16. The device of claim 11, wherein the program instructions, when executed by the one or more processors, further cause the one or more processors to:

prior to determining the one or more patches:
identify one or more outlier points of the point cloud that have motions that deviate from surrounding points across the multiple moments in time by more than an outlier threshold amount; and
remove the one or more outlier points from point cloud data used to determine the one or more patches.

17. The device of claim 11, wherein the one or more patches are determined based on identifying points that have surface normal vectors that deviate from one another at each of the multiple moments in time by less than the threshold amount.

18. A system comprising:
one or more computers configured to:
generate visual volumetric content comprising a point cloud comprising a plurality of points in three-dimensional (3D) space, wherein respective ones of the points comprise spatial information for the point and attribute information for the point; and
compress the generated point cloud into a plurality of video images comprising packed patch images, wherein to determine patches for use in generating the patch images, the one or more computers are configured to:
determine one or more motion functions that model motion of one or more segments of the point cloud across multiple moments in time;
determine, based on the one or more motion functions, mappings between points of the point cloud across the multiple moments in time; and
generate the patches, wherein the patches comprise points of the point cloud that deviate from one another at each of the multiple moments in time by less than a threshold amount.

19. The system of claim 18, wherein to determine the one or more motion functions, the one or more computers are configured to:
segment the generated point cloud at a first moment in time into a plurality of segments, each segment comprising one or more points of the point cloud in 3D space;
determine motion compensation functions to apply to the segments at the first moment in time to model motion of the points included in the segments at the first moment in time to a target moment in time;
determine location differences between locations of the points determined using the motion compensation functions and actual locations of the points of the point cloud at the target moment in time; and
in response to the determined location differences exceeding one or more thresholds, further segment one or more of the segments, determine motion compensation functions for the further segmented one or more segments, and determine location differences for points of the further segmented one or more segments, wherein the one are more computers are configured to further segment segments of the point cloud until the locations differences are less than the one or more thresholds.

20. The system of claim 18, wherein prior to generating the patches for the point cloud, the one or more computers are configured to:
identify one or more versions of the point cloud at one or more respective moments in time that comprise a greater number or a lesser number of points than other versions of the point cloud at other moments in time; and
re-sample at least one of the versions of the point cloud such that the re-sampled at least one version of the point cloud comprises a same number of points as other versions of the point cloud.

* * * * *